(12) United States Patent
Fujiwara

(10) Patent No.: US 11,155,192 B2
(45) Date of Patent: Oct. 26, 2021

(54) FOAM MOLDED ARTICLE, METHOD FOR MANUFACTURING MOLDED FOAM ARTICLE, AND SEAT FOR AUTOMOBILE

(71) Applicant: KANEKA CORPORATION, Osaka (JP)

(72) Inventor: Hiroshi Fujiwara, Osaka (JP)

(73) Assignee: KANEKA CORPORATION, Osaka (JP)

( * ) Notice: Subject to any disclaimer, the term of this patent is extended or adjusted under 35 U.S.C. 154(b) by 117 days.

(21) Appl. No.: 16/210,355

(22) Filed: Dec. 5, 2018

(65) Prior Publication Data

US 2019/0106036 A1 Apr. 11, 2019

Related U.S. Application Data

(63) Continuation of application No. PCT/JP2017/019221, filed on May 23, 2017.

(30) Foreign Application Priority Data

Jun. 14, 2016 (JP) .............................. JP2016-118035

(51) Int. Cl.
*B60N 2/64* (2006.01)
*B29C 44/12* (2006.01)
(Continued)

(52) U.S. Cl.
CPC ............. *B60N 2/646* (2013.01); *A47C 27/14* (2013.01); *B29C 44/00* (2013.01); *B29C 44/12* (2013.01);
(Continued)

(58) Field of Classification Search
CPC .... B60N 2/646; B60N 2/7017; B60N 44/181; A47C 27/14; B29C 44/12; B29C 44/1228; B29C 44/1285; B29C 44/3411
(Continued)

(56) References Cited

U.S. PATENT DOCUMENTS 8,398,166 B2 * 3/2013 Lindsay ................. B60N 2/015
  297/452.27 X
8,439,440 B2 * 5/2013 Ellison ..................... B60N 2/70
  297/452.27
(Continued)

FOREIGN PATENT DOCUMENTS

JP S54-45711 U 3/1979
JP S58-62026 A 4/1983
(Continued)

OTHER PUBLICATIONS

Supplementary European Search Report issued in corresponding European Application No. 17813098 dated Jan. 10, 2020 (2 pages).
(Continued)

*Primary Examiner* — Anthony D Barfield
(74) *Attorney, Agent, or Firm* — Osha Bergman Watanabe & Burton LLP

(57) ABSTRACT

A foam molding article includes an outer-shell-configuring part, an insert that is at least partially embedded in the outer-shell-configuring part, and a fitting member. The outer-shell-configuring part includes a body side foam member. The body side foam member includes a foam and a missing part where a part of the foam is missing. The missing part is located in an intermediate part of the body side foam member, and the fitting member is mounted in the missing part.

11 Claims, 15 Drawing Sheets

(51) Int. Cl.
  *A47C 27/14* (2006.01)
  *B29C 44/00* (2006.01)
  *B29C 44/18* (2006.01)
  *B29C 44/34* (2006.01)
  *B60N 2/70* (2006.01)
  *B29L 31/58* (2006.01)
  *B29L 31/00* (2006.01)

(52) U.S. Cl.
  CPC ...... *B29C 44/1228* (2013.01); *B29C 44/1285* (2013.01); *B29C 44/181* (2013.01); *B29C 44/3411* (2013.01); *B60N 2/7017* (2013.01); *B29C 44/128* (2013.01); *B29K 2715/003* (2013.01); *B29L 2031/58* (2013.01); *B29L 2031/771* (2013.01)

(58) Field of Classification Search
  USPC .................................................. 297/452.27
  See application file for complete search history.

(56) References Cited

U.S. PATENT DOCUMENTS

| | | | |
|---|---|---|---|
| 10,479,247 B2 * | 11/2019 | Miyawaki | B60N 2/6009 |
| 2015/0028650 A1 | 1/2015 | Rossi et al. | |

FOREIGN PATENT DOCUMENTS

| | | | | |
|---|---|---|---|---|
| JP | H09-1566 | A | 1/1997 | |
| JP | 2009-56190 | A | 3/2009 | |
| JP | 2010-12687 | A | 1/2010 | |
| JP | 2011-45629 | A | 3/2011 | |
| JP | 2012-51439 | A | 3/2012 | |
| JP | 5277912 | B2 * | 8/2013 | ............ B60N 2/646 |
| JP | 5344395 | B2 | 11/2013 | |
| JP | 2015-174340 | A | 10/2015 | |
| JP | 2016-22292 | A | 2/2016 | |
| JP | 2016-60064 | A | 4/2016 | |

OTHER PUBLICATIONS

International Preliminary Report on Patentability issued in International Application No. PCT/JP2017/019221; dated Dec. 27, 2018 (10 pages).
International Search Report issued in International Application No. PCT/JP2017/019221, dated Jul. 25, 2017 (2 pages).
Written Opinion issued in International Application No. PCT/JP2017/019221, dated Jul. 25, 2017 (5 pages).

* cited by examiner

FOAM MOLDED ARTICLE, METHOD FOR MANUFACTURING MOLDED FOAM ARTICLE, AND SEAT FOR AUTOMOBILE

TECHNICAL FIELD

One or more embodiments of the present invention relate to a foam molding article. The foam molding article of one or more embodiments of the present invention is obtained by embedding an insert such as a metal in a foam and integrating the insert with the foam. The foam molding article of one or more embodiments of the present invention has less warp, and does not impair the tactile sensation (feeling when sitting on the foam molding article) and rigidity feeling of the molded article.

The foam molding article of one or more embodiments of the present invention is suitable as a rigidity-imparting material for a seat for an automobile.

One or more embodiments of the present invention also relate to a method for manufacturing a foam molding article.

BACKGROUND

A foam molding article, which is obtained by integrally molding an insert made of a metal and the like and a foam, is known. This type of foam molding article can be manufactured by a manufacturing method referred to as so-called insert molding.

Patent Document 1 discloses a foam molding article obtained by integrally molding a ring-shaped metal part on the outer periphery of a foam. Patent Document 1 discloses that the foam molding article is employed as a core (rigidity-imparting material) of a seat for an automobile.

When olefin-based resin foamed particles having excellent cushioning properties are employed as a material of a foam; an insert is set in a mold for use in molding; and the insert is molded so as to be embedded in the outer periphery of the foam, the difference in shrinkage rate between the insert and a foam material sometimes causes warp. Therefore, the use of the foam molding article having the above-described structure as a part requiring high precision, for example, a part for a seat for an automobile may cause difficulty in assembling with other members.

The reason why the warp occurs in the foam molding article will be described below.

The foam molding article is obtained by mounting an insert in a mold for use in molding, introducing expanded particles into a cavity of the mold for use in molding, and foaming the expanded particles in the cavity to integrate the insert and the foam.

However, as described above, when the insert is set in the mold for use in molding, and the expanded particles are foamed and molded in the mold for use in molding, warp may occur in the foam molding article.

This is presumed to be caused by the difference in shrinkage rate between the insert and the foam. That is, the expanded particles of the olefin-based resin are heated and expanded in the mold for use in molding, whereby the foam surrounds and encloses the insert. The foam of the foam molding article removed from the mold for use in molding shrinks as the temperature decreases. On the other hand, the insert embedded in the foam does not substantially shrink.

For example, if the insert is made of a metal, and the foam is an olefin-based resin, the adhesion force between the insert and the foam is weak, whereby the interface is relatively moved.

However, the insert has an annular shape or has a region partially having a large volume. For this reason, a part of the insert is physically engaged with the foam therein, and the insert apparently has a state where a compressive force is applied from both ends. As a result, the shrinkage of the foam causes a stress to be applied to the insert, whereby the insert is deflected. When the deflection amount of the insert is large, the insert is deformed beyond an elastic region, and plastically deformed.

The foam shrinks immediately after molding as described above, but the foam restores its original volume with the lapse of time. However, the internal insert is not completely restored but remains deflected. Therefore, warp may occur in the foam molding article.

In particular, when the foam molding article is used for a part requiring high accuracy, for example, an automobile part, the warp occurring in the foam molding article may be non-negligible in terms of quality.

In Patent Document 2, a foam having a groove in which an insert is installed is molded, and after the foam is molded, the insert is inserted into the above-described groove to complete a foam molding article.

On the contrary, in Patent Document 3, a foam molding article incorporating an insert is molded, and a groove is formed in the foam molding article immediately after molding. More specifically, an insert is mounted in a mold for use in molding; expanded particles are introduced into a cavity of the mold for use in molding; and the expanded particles are foamed in the cavity to mold a foam molding article in which the insert and the foam are integrated. Immediately after removing the foam molding article from the mold for use in molding, the surface of the foam molding article is cut with a cutter knife to form a groove.

PATENT DOCUMENTS

Patent Document 1: JP 5344395 B2
Patent Document 2: JP 2016-22292 A
Patent Document 3: JP 2015-174340 A According to Patent Documents 2 and 3, the occurrence of warp in the foam molding article is solved. However, according to Patent Documents 2 and 3, an additional step is required after the foam molding step, and the step is a skillful work. In particular, in Patent Document 2, it takes time and effort to incorporate the insert over the substantially entire outer periphery of the molded article after molding, and the groove is formed to be narrow enough to hold the insert, whereby it is feared that the poor precision of the insert disadvantageously makes it difficult to incorporate the insert.

In particular, in Patent Document 3, the foam molding article removed from the mold for use in molding is cut with a sharp cutter knife. Therefore, this requires time and effort.

The foam molding article is used as the seat for an automobile, whereby a person sits on the seat for an automobile to repeatedly deflect the seat for an automobile. Herein, in Patent Document 3, the foam has a cut formed by the cutter knife, whereby stress concentration occurs in the bottom region of the cut groove. The repeated stress caused by the sitting of the person may break the foam at an early stage.

SUMMARY

Meanwhile, the present applicant also examined measures to reduce the occurrence of warp in a foam molding article, and previously filed the patent application (Japanese Patent Application No. 2015-064956, not yet published).

One or more embodiments of the invention filed by the present applicant are directed to a foam molding article having a structure in which a foam is separated into a plurality of pieces so that an insert and a foam can be relatively moved to each other.

According to the foam molding article proposed by one or more embodiments of the present applicant, even if the volume of the foam is changed after the foam is molded, the insert is relatively moved to the foam, whereby no compression force is applied to the insert, which causes the deflection of the insert to be alleviated. Therefore, the warp of the foam molding article is alleviated.

One or more embodiments of the invention filed by the present applicant makes it possible to reduce the warp of the foam molding article. However, according to this configuration, a gap is formed between the foams, whereby, for example, the use of a foam molding article, as a part for a seat for an automobile, in applications for "sitting" thereon may cause the difference in seating comfort depending on a place.

When the foam molding article is used as a rigidity-imparting member for the seat for an automobile, a foamed layer made of urethane and the like may be provided on the surface of the foam molding article. Therefore, the above-described difference in seating comfort seems to be alleviated by a urethane raw material flowing into the gap and filling the gap when the urethane resin and the foam molding article are integrated. However, an olefin-based resin and a urethane resin are different from each other in material characteristics, whereby poor seating comfort may still remain.

Furthermore, in one or more embodiments of the invention filed by the present applicant, the foam which is originally an integrated product is separated into a plurality of divided foam pieces, whereby when a large foam molding article is particularly lifted, the whole of the foam molding article is deflected, and the foam molding article may be bent. That is, the foam molding article is used as the rigidity-imparting member for the seat for an automobile, whereby the foam molding article is moved between various apparatuses and molds until the foam molding article serves as the seat for an automobile as a final product. At that time, there is a fear that due to its own weight, deflection occurs or unrecoverable deformation occurs.

When the foam molding article is carried, the foam molding article is elastically deformed by its own weight, which may make it difficult to maintain a certain shape, and may disadvantageously cause difficulty in carrying.

One or more embodiments of the present invention provide measures for improving the invention preliminarily proposed by the present applicant. In particular, the difference in sitting comfort at different regions, which is felt when it is used as a core of a seat and the like, has been improved.

That is, one or more embodiments of the present invention provide a foam molding article having less warp and an integrated feeling, and a method for manufacturing the same. One or more embodiments of the present invention provide a seat for an automobile having good seating comfort.

The present inventors have found that, by using olefin-based resin particles and by installing an embedding member made of the same material as that of the foam in a groove-shaped space part of a foam divided at a groove-shaped space from side to side in a structure in which an insert is embedded in the foam, feelings such as a rigidity feeling of the whole molded article or a touch feeling and seating comfort depending on a place can be improved.

One or more embodiments of the present invention relate to a foam molding article including: an outer-shell-configuring part; and an insert partially or completely embedded in the outer-shell-configuring part, wherein the outer-shell-configuring part includes a body side foam member including a foam and a missing part where a part of the foam is missing, the missing part being located in an intermediate part of the body side foam member, and wherein a separate fitting member is mounted in the missing part.

One or more embodiments of the present invention, it is desirable that the missing part is located at a position where a stress applied to the insert can be alleviated during a volume change of the outer-shell-configuring part.

In one or more embodiments of the present invention, it is desirable that the insert includes a first engagement part engaged with the foam in the body side foam member and a first connecting part connecting two or more of the engagement parts, and the missing part is located in a portion corresponding to the first connecting part of the insert.

In one or more embodiments of the present invention, it is desirable that the insert includes a second engagement part engaged with the foam in the body side foam member and a second connecting part connecting two or more of the engagement parts, and the missing part is located in a portion corresponding to the second engagement part of the insert.

In one or more embodiments of the present invention, it is desirable that the missing part is a portion where the insert is exposed.

In one or more embodiments of the present invention, it is desirable that the body side foam member is separated into a plurality of divided foam pieces, and the missing part is located between the divided foam pieces.

In one or more embodiments of the present invention, it is desirable that the fitting member includes a foam, and a main ingredient of the foam constituting the fitting member is the same as that of the foam constituting the body side foam member.

In one or more embodiments of the present invention, it is desirable that a surface shape of the fitting member mounted in the missing part is smoothly connected with a surface shape of the foam constituting the body side foam member in a vicinity of the missing part.

In one or more embodiments of the present invention, it is desirable that the fitting member is physically engaged with the foam constituting the body side foam member.

In one or more embodiments of the present invention, it is desirable that the fitting member is physically engaged with the insert.

One or more embodiments of the present invention relate to a seat for an automobile including: the foam molding article; a cushion layer; and a skin layer.

One or more embodiments of the present invention relate to a method for manufacturing a foam molding article that includes a body side foam member including a foam and a fitting member, the method including: a body part molding step of molding the body side foam member; a fitting member molding step of molding the fitting member; and a fitting step of mounting the fitting member in the body side foam member, wherein the body side foam member is constituted to partially or completely embed an insert into the foam made of an olefin-based resin, the body side foam member including a missing part where a part of the foam is missing, the missing part being located in an intermediate part of the body side foam member, wherein the fitting member is configured to be mounted in the missing part, and wherein the fitting step mounts the fitting member in the missing part.

In one or more embodiments of the present invention, it is desirable that the body side foam member includes a plurality of divided foam pieces, and the missing part is constituted between the divided foam pieces.

In one or more embodiments of the present invention, a volume of the body side foam member is changed after molding; and, as a next step of the body part molding step, the fitting member is mounted in the missing part after a volume change of the body side foam member converges.

The foam molding article of one or more embodiments of the present invention and the foam molding article manufactured by the manufacturing method of one or more embodiments of the present invention have less warp and have an integrated feeling. The seat for an automobile of one or more embodiments of the present invention has good seating comfort.

DETAILED DESCRIPTION OF THE EMBODIMENTS

Hereinafter, one or more embodiments of the present invention will be described.

Figure 1:
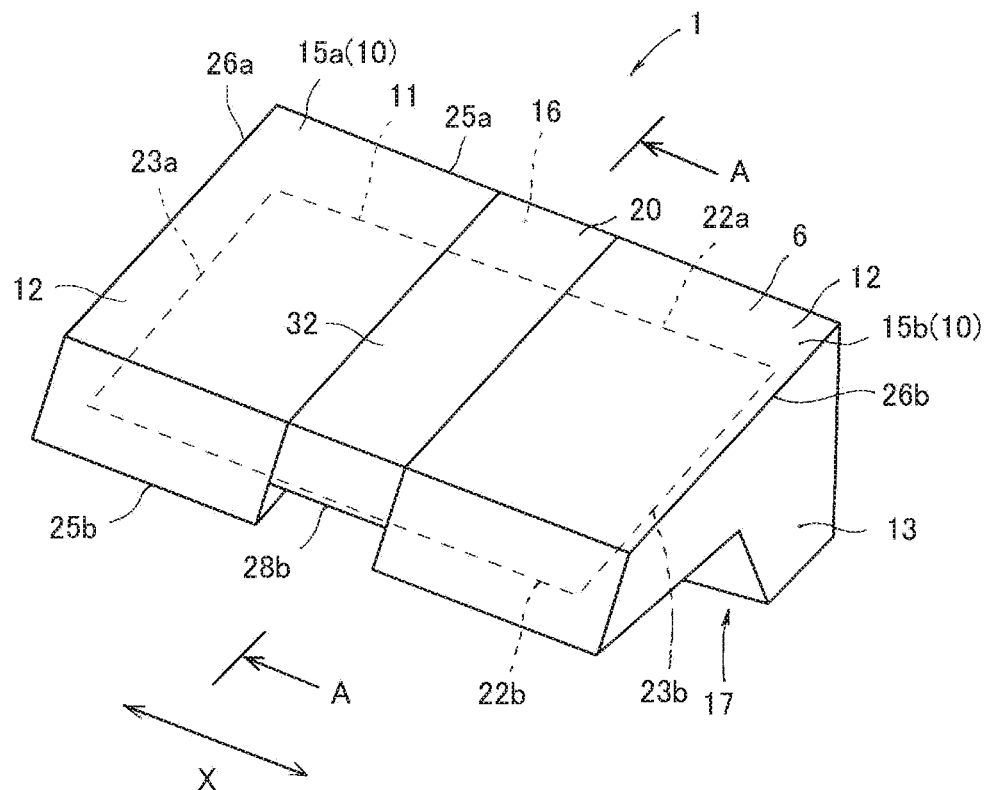
FIG. 1 is a perspective view of a foam molding article according to one or more embodiments of the present invention.
Figure 2:
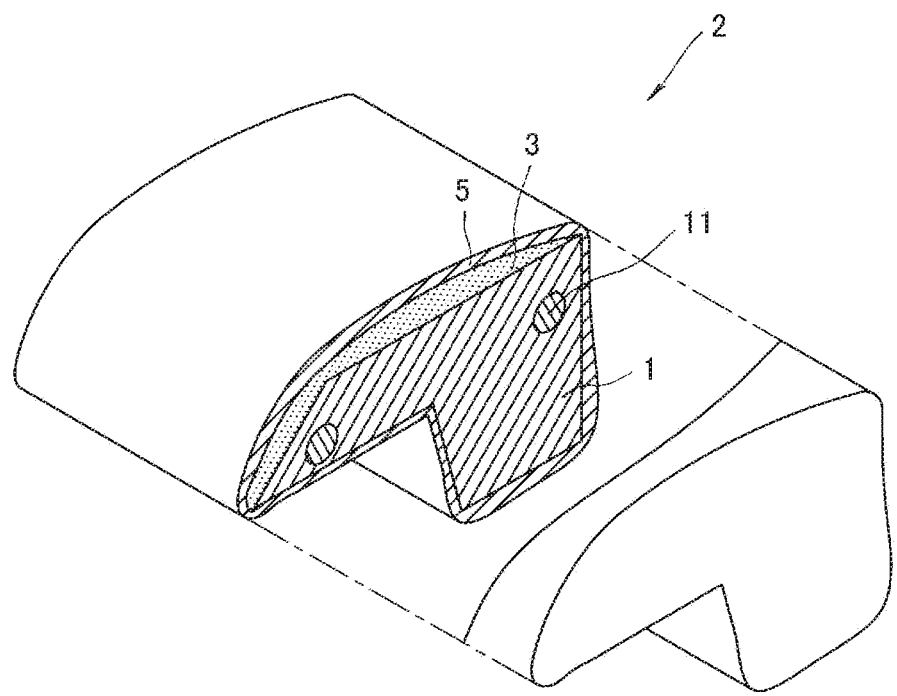
FIG. 2 is a partial perspective cross-sectional view of a seat for an automobile including the foam molding article of FIG. 1 as a rigidity-imparting member.

FIG. 1 shows a foam molding article 1 according to one or more embodiments of the present invention. As shown in FIG. 2, the foam molding article 1 of one or more embodiments may be used as a rigidity-imparting member (core) of a seat for an automobile 2.

In one or more embodiments, the seat for an automobile 2 includes a rigidity-imparting member (foam molding article 1), a cushion layer 3, and a skin layer 5.

In one or more embodiments, the seat for an automobile 2 is obtained by mounting a skin material (skin layer 5) and a rigidity-imparting member (foam molding article 1) on an integral mold for use in molding (not shown), injecting a foamed urethane raw material such as polyol or polyisocyanate between the rigidity-imparting member (foam molding article 1) and the skin material, and integrating the rigidity-imparting member (foam molding article 1), the cushion layer 3, and the skin layer 5.

The skin layer 5 may be made of a resin, or may be made of a cloth or a leather. A method for manufacturing the seat for an automobile 2 is not limited, and the method may include placing a separately molded cushion layer 3 on a rigidity-imparting member (foam molding article 1), and wrapping the rigidity-imparting member including the cushion layer 3 with a cloth and the like (skin layer 5).

In one or more embodiments, the foam molding article 1 as the rigidity-imparting member is obtained by embedding an insert 11 in an outer-shell-configuring part 6 constituted by a foam.

As will be described later, in one or more embodiments the outer-shell-configuring part 6 includes a body side foam member 10 and a fitting member 20, and the insert 11 is partially embedded in the body side foam member 10. The insert 11 is partially exposed from the body side foam member 10.

Figure 20A:
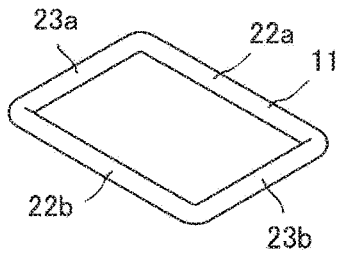
FIG. 20A to 20F are a perspective view of an insert employed in the foam molding article of FIG. 1, and perspective views of modification examples of the insert.

In one or more embodiments the insert 11 has an annular shape as shown in FIGS. 1, 2, and 20A, and has a substantially rectangular planar shape.

As shown in FIGS. 1, 2, and 20A, the insert 11 employed in one or more embodiments has a substantially rectangular shape, and includes two long sides 22a and 22b arranged in parallel, and two short sides 23a and 23b arranged in parallel.

The insert 11 of one or more embodiments of the present invention is insert-molded and built in the outer-shell-configuring part 6, more precisely near the substantially outer periphery of the body side foam member 10. The insert 11 is made of a material having sufficiently higher strength to increase the overall strength comparing when constituted by only a foamed resin. As the material of the insert 11, for example, a metal material such as an iron-based material is preferably employed.

In one or more embodiments, the manufacturing method and material of the insert 11 are arbitrary, and a bent wire rod having a circular cross section can be suitably used due to the easy molding work. A rib, a bar, and a plate and the like for attaching the seat for an automobile 2 as the final product to other parts may be attached to the insert 11. In one or more embodiments, the rib and the like are not shown for simplicity of explanation, but in one or more embodiments of the present invention, a plate material and the like can be partially attached to the insert 11, or the insert 11 itself can be produced with a plate material.

When the insert 11 is manufactured with a wire material having a circular cross section (for example, a round bar), the diameter of the wire material having a circular cross section is suitably 1 to 6 mm, and preferably 2 to 5 mm due to the easy bending work and strength retention properties after work, further a weight, working accuracy, and resultant cost which are important especially in an automobile and the like.

The insert 11 of one or more embodiments of the present invention has a closed structure formed by bending the above-described wire rod along the substantially outer periphery of the outer-shell-configuring part 6 and joining the ends of the insert 11.

The overall size of the insert 11, that is, the overall length and the overall width can be freely selected depending on the filling of foamed resin particles, easiness for spreading when the foamed resin particles are expanded, and easiness for exhibiting rigidity.

When the overall length and overall width of the insert 11 are short; the insert 11 is deeply embedded in the outer-shell-configuring part 6; and the distance between the end part of the outer-shell-configuring part 6 and the insert 11 is large, then the foamed resin particles are easily filled and enlarged. For example, when the distance between the outer end of the outer-shell-configuring part 6 and the insert 11, that is, the distance between the outer-shell-short sides 26a and 26b of the outer-shell-configuring part 6 and the short sides 23a and 23b of the insert 11 is 5 mm or more, the foamed resin particles can be filled. From this viewpoint, it is preferable that the distance between the outer end of the outer-shell-configuring part 6 and the insert 11 is 10 mm or more.

On the other hand, if the distance between the outer end of the outer-shell-configuring part 6 and the insert 11 is excessively long, the rigidity imparting action of the insert may not be effectively exhibited. Therefore, the distance between the outer end of the outer-shell-configuring part 6 and the insert is preferably 100 mm or less, and more preferably 50 mm or less.

A known method such as welding method and a caulking method using a clasp after butting can be selected as a joining method for forming the insert 11 into an annular shape.

Next, the outer-shell-configuring part 6 of one or more embodiments will be described. The outer-shell-configuring part 6 includes the body side foam member 10 and the fitting member 20.

In one or more embodiments, the outer-shell-configuring part 6 has a substantially "inverted L" shaped cross-sectional shape, and includes a horizontal base part 12 and a support base part 13 hanging from one long side of the horizontal base part 12.

When the outer-shell-configuring part 6 is observed as a whole, a large notch part 17 is formed in a corner of a rectangular parallelepiped.

In one or more embodiments the body side foam member 10 of the outer-shell-configuring part 6 constitutes a body portion of the foam molding article 1. The body side foam member 10 of the outer-shell-configuring part 6 constitutes the major part of the outer shell of the foam molding article 1 and the outer-shell-configuring part 6, but the body side foam member 10 includes a missing intermediate portion in which a groove-shaped gap (missing part 16) is located at a center position.

Figure 3:
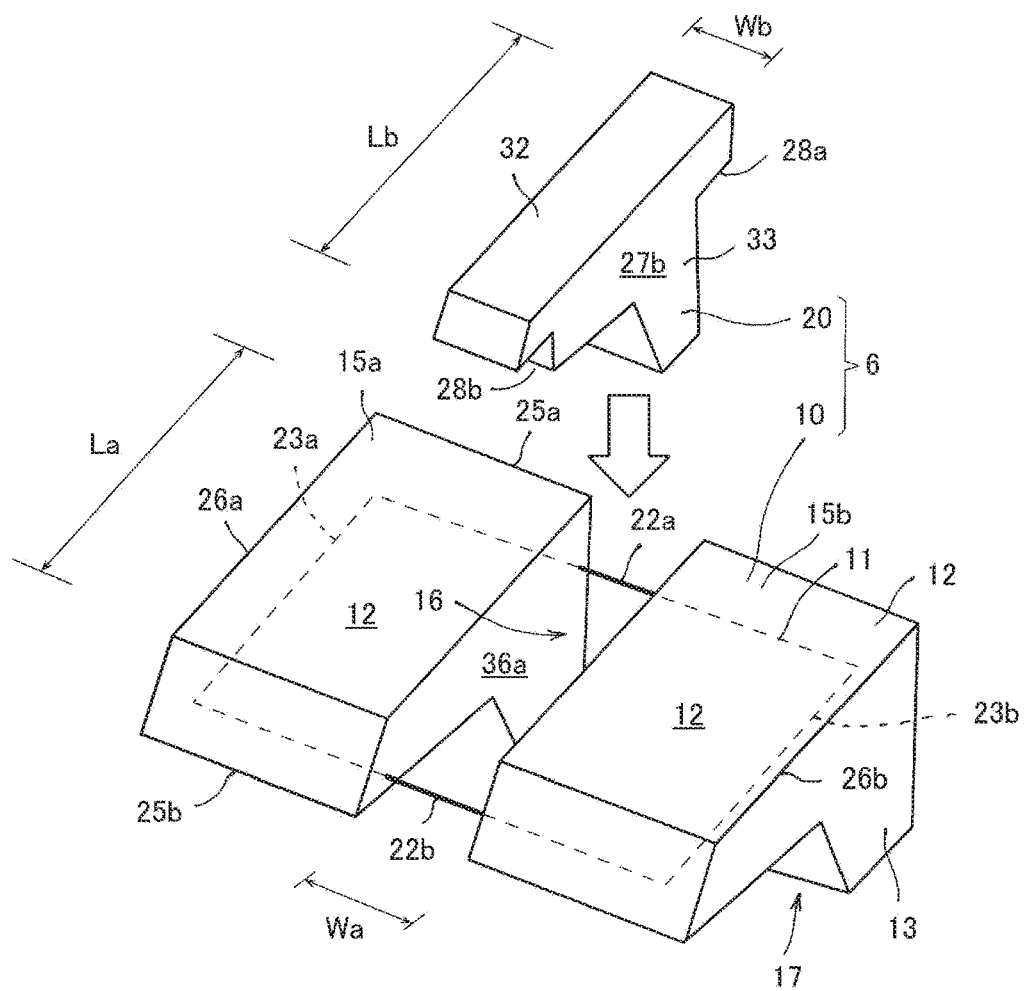
FIG. 3 is an exploded perspective view of the foam molding article of FIG. 1.

The body side foam member 10 of one or more embodiments is obtained by integrally embedding the insert 11 in the foam. In the body side foam member 10 of one or more embodiments, as shown in FIG. 3, the foam is separated into a plurality of divided foam pieces 15a and 15b. The foam constituting the body side foam member 10 is divided into two or more in a longitudinal direction orthogonal to the opening/closing direction of a mold for use in molding, and a gap is provided therebetween.

This divided structure can be easily realized by imparting a shape for division such as a partition to a cavity of the mold for use in molding.

Therefore, in the body side foam member 10 of one or more embodiments, the missing part 16 is located in the intermediate portion.

In one or more embodiments, the divided foam pieces 15a and 15b have a symmetrical shape, and the same size. Therefore, the missing part 16 is located in the center part of the body side foam member 10.

In the drawings, for easy understanding, the width Wa of the missing part 16 is drawn so as to be wider than it actually is. The width Wa of the missing part 16 is about 5 mm to 100 mm, more preferably about 10 mm to 80 mm, and more preferably about 15 mm to 60 mm.

In one or more embodiments, the insert 11 is embedded so that the sides 22a, 22b, 23a, and 23b are parallel to the outer shell of the outer-shell-configuring part 6.

Therefore, the long sides 22a and 22b of the insert 11 are arranged in parallel or substantially in parallel with the long sides 25a and 25b of the outer-shell-configuring part 6. The short sides 23a and 23b of the insert 11 are arranged in parallel or substantially parallel to the short sides 26a and 26b of the body side foam member 10.

On the other hand, in one or more embodiments, one of the divided foam piece 15a and 15b is completely independent from the other of the divided foam piece 15a and 15b, and both of the divided foam piece 15a and 15b are located close to the short sides 26a and 26b side of the outer-shell-configuring part 6.

The short sides 23a and 23b of the insert 11 are entirely embedded in the divided foam pieces 15a and 15b. That is, one short side 23a of the insert 11 is completely embedded in one divided foam piece 15a. The other short side 23b of the insert 11 is completely embedded in the other divided foam piece 15b.

In the divided foam pieces 15a and 15b, the long sides 22a and 22b connected to the other short side 23b of the embedded insert 11 are partially embedded.

In the body side foam member 10 of one or more embodiments, no foam is located between the divided foam pieces 15a and 15b (missing part 16). That is, in the body side foam member 10 of one or more embodiments, one of the divided foam piece 15a and 15b is completely independent from the other of the divided foam piece 15a and 15b, and no foam is located between the divided foam pieces 15a and 15b (missing part 16). Therefore, in one or more embodiments, the insert 11 is exposed to the missing part 16. More specifically, the intermediate portions of the two long sides 22a and 22b of the insert 11 are exposed to the missing part 16. In one or more embodiments, only the two long sides 22a and 22b of the insert 11 connect the left and right divided foam pieces 15a and 15b, and the entire circumferences of the two long sides 22a and 22b of the insert 11 corresponding to the missing part 16 in the cross-sectional direction are exposed.

In the missing part 16, it is preferable that the insert 11 is completely exposed to the outside as in one or more embodiments, but at least a part of the insert 11 may be covered with the foam within the allowable range of warp of the foam molding article 1.

The foam molding article 1 of one or more embodiments is characterized in that the fitting member 20 is fitted into the above-described missing part 16.

The fitting member 20 has such a shape that the divided foam pieces 15a and 15b are thinly sliced, and the cross-sectional shape cut in parallel with the short sides 26a and 26b of the body side foam member 10 (hereinafter, the cross-sectional shape) is similar to that of the divided foam pieces 15a and 15b.

That is, the fitting member 20 fills the gap (missing part 16) of the body side foam member 10, and connects the divided foam pieces 15a and 15b. In one or more embodiments, the fitting member 20 has a substantially "inverted L" cross-sectional shape, and includes a horizontal base part 32 and a support base part 33 hanging from one long side of the horizontal base part 32.

In one or more embodiments the cross-sectional shape of the fitting member 20 and the cross-sectional shape of the divided foam pieces 15a and 15b are different from each other in that the rod-like portion of the insert 11 is embedded in the divided foam pieces 15a and 15b, and the fitting member 20 includes releasing notch parts 28a and 28b for releasing the rod-like portion of the insert 11.

The width (thickness) Wb of the fitting member 20 is slightly wider than the width Wa of the above-described missing part 16.

In the foam molding article 1 of one or more embodiments, as shown in FIG. 1, the fitting member 20 is mounted in the missing part 16 where the foam formed in the intermediate part of the body side foam member 10 is missing. In the foam molding article 1 having a state where the fitting member 20 is mounted, the separated left and right divided foam pieces 15a and 15b are smoothly connected by the fitting member 20.

More specifically, the horizontal base part 12 of the one divided foam piece 15a, the horizontal base part 32 of the fitting member 20, and the horizontal base part 12 of the other divided foam piece 15b are smoothly connected without a large step, which substantially constitute one curved surface. The fitting member 20 includes the releasing notch parts 28a and 28b for releasing the rod-like portion of the insert 11, and as shown in FIG. 1, this region is a discontinuous surface.

Figure 4:
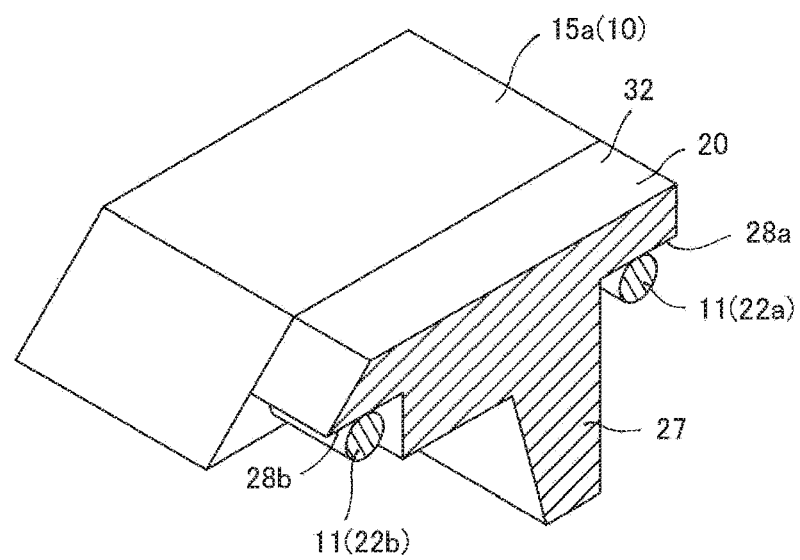
FIG. 4 is a perspective cross-sectional view of the foam molding article of FIG. 1 taken along line A-A.

As shown in FIG. 4, the intermediate portions of the long sides 22a and 22b of the insert 11 exposed in the missing part 16 are accommodated in the releasing notch parts 28a and 28b of the fitting member 20.

In one or more embodiments the direction in which the fitting member 20 is fitted into the body side foam member 10 is not limited, and the fitting member 20 is easily and suitably inserted from a vertical direction into the plane surface corresponding part of the body side foam member 10 exposed when the body side foam member 10 is molded and the mold for use in molding is opened. In one or more embodiments, as shown in FIG. 3, the fitting member 20 is desirably inserted from the surface side of the horizontal base part 12 of the body side foam member 10.

The fitting member 20 is preferably fitted such that the surface of the horizontal base part 32 thereof has the same height as that of the horizontal base part 12 of the divided foam pieces 15a and 15b without forming a step. This reduces not only a strength difference but also an uncomfortable feeling caused by the step, which is preferable. Particularly, the fitting member is preferably fitted into regions which form a design surface and a functional surface such that no step is formed.

It is obvious that, when a design-like or functional hole is provided, the fitting member is not fitted into the portion.

In one or more embodiments, the fitting member 20 may be separately molded, or when the mold for use in molding for molding the body side foam member 10 has a margin size, the fitting member 20 may be molded at the same time when the body side foam member 10 is molded. Alternatively, the fitting member 20 may be obtained by cutting a plate-like or massive foam material into a predetermined shape according to cutting work and the like.

In one or more embodiments, the fitting member 20 is preferably made of a material having substantively the same compressive strength as that of the divided foam pieces 15a and 15b of the body side foam member 10 which is a body portion, and more preferably a foam having substantially the same material and density.

Thus, for example, when the foam molding article 1 is employed as the core of the seat for an automobile (rigidity-imparting member), the difference in seating comfort caused by the difference in strength, that is, the uncomfortable feeling can be reduced.

Of course, a fitting member 20 having different compressive strength or density from that of the divided foam pieces 15a and 15b can also be used. In this case, even if the deterioration in a rigidity feeling as compared with the case where the fitting member 20 is not fitted can be improved, an uncomfortable feeling may still remain in a feeling such as seating comfort.

In one or more embodiments, the projected shapes of end faces 27a and 27b of the fitting member 20 are desirably the same as or approximate to the projected shapes of end faces 36a and 36b of the divided foam pieces 15a and 15b. In order to reduce the difference in seating comfort, it is preferable that lengths La and Lb of upper surface portions of the horizontal base parts 12 and 32 of both of them are about the same.

If the length Lb of the horizontal base part 32 of the fitting member 20 is less than the length La of the divided foam pieces 15a and 15b, no fitting member 20 is placed in a local part or an end part where the fitting member 20 is not installed, which may cause an uncomfortable feeling.

If the foam molding article 1 is used for an article having substantially no influence of overall rigidity for a portion having no fitting member 20, the length Lb of the fitting member 20 and the length La of the divided foam pieces 15a and 15b may be different from each other.

Even when the foam molding article 1 is employed for the seat for an automobile, an uncomfortable feeling is less likely to be generated by the absence of the fitting member 20 in the local part or the end part where the fitting member 20 is not installed. Alternatively, the length Lb of the fitting member 20 and the length La of the divided foam pieces 15a and 15b may be different from each other when passengers do not sit on the portion that causes disadvantageously uncomfortable feeling.

As described above, in one example of the width Wb of the fitting member 20, the width Wb is made to be slightly wider than the width Wa of the missing part 16 as a groove-shaped interval.

According to this configuration, the fitting member 20 is installed so as to push and open the divided molded article (divided foam pieces 15a and 15b), which causes the fitting member 20 to be surely fixed to the body side foam member 10. According to this configuration, the end face 27 of the fitting member 20 and the end face 36 of the divided foam pieces 15a and 15b are strongly pressed to each other, which causes the fitting member 20 to be physically engaged with the foam constituting the body side foam member 10.

A preferable difference between the width Wb of the fitting member 20 and the width Wa of the missing part 16 depends on the distance between the end faces 36a and 36b of the divided foam pieces 15a and 15b as the width Wa of the missing part 16 and the material of the divided foam pieces 15a and 15b, and cannot be completely determined. The width Wb of the fitting member 20 may be made larger than the width Wa of the missing part 16 to such an extent that it can be locked by a side pressure caused by friction or by pressing and fixing.

For example, when the width Wa of the missing part 16 as a groove-shaped interval is about 30 mm, the fitting member 20 can be sufficiently locked by setting the width Wb of the fitting member 20 to about 30 mm or increasing the width Wb of the fitting member 20 by about 0.5 mm or less.

Too large width Wb of the fitting member 20 causes difficult fitting installation. Even if the missing part 16 and the fitting member 20 have substantially the same thickness, the end faces 36a and 36b of the divided foam pieces 15a and 15b also have slight unevenness, and fuzz in the case of cutting work, whereby the fitting member 20 can be locked by friction with them.

In one or more embodiments, the width (thickness) of the fitting member 20 may be partially increased without the width of the fitting member 20 being entirely increased, and the width of the other portion may be the same as or thinner than the width Wa of the missing part 16. If the width (thickness) of the fitting member 20 is entirely increased, large resistance makes it difficult to install the fitting member 20 in the missing part 16, but this point can be improved by increasing only a part of the width (thickness).

Figure 5A:
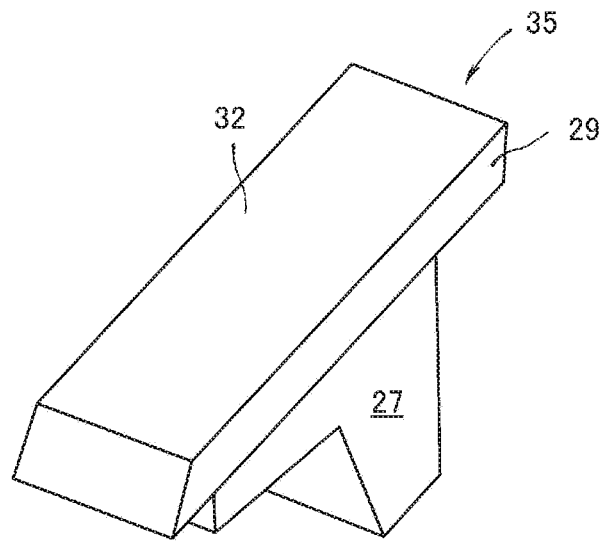
FIGS. 5A and 5B are a perspective view of a rigidity-imparting member employed in one or more embodiments of the present invention, and a side view thereof, in which a swollen portion is indicated by hatching.
Figure 5B:
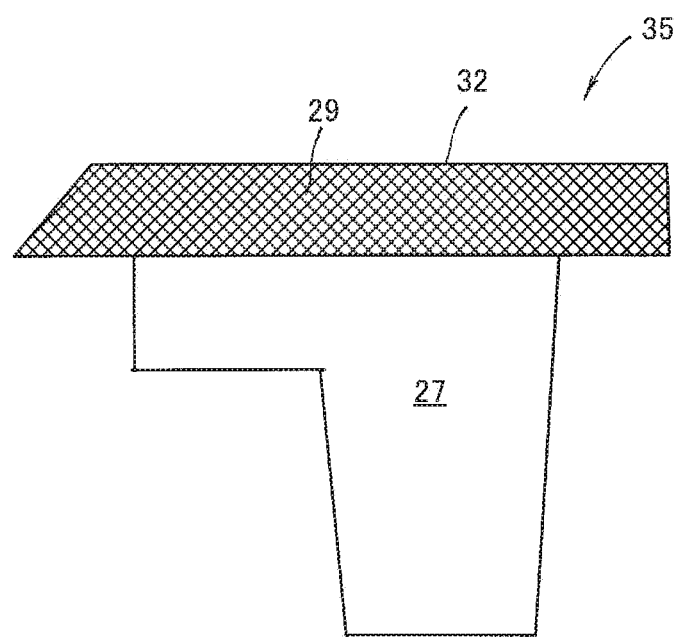

A fitting member 35 shown in FIG. 5 is widely molded only on the upper side 29 of the horizontal base part 32 (portion indicated by hatching in FIG. 5b). In other words, a projecting part is provided on the side surface of the horizontal base part 32 on the end face 27 of the fitting member 35.

Figure 6A:
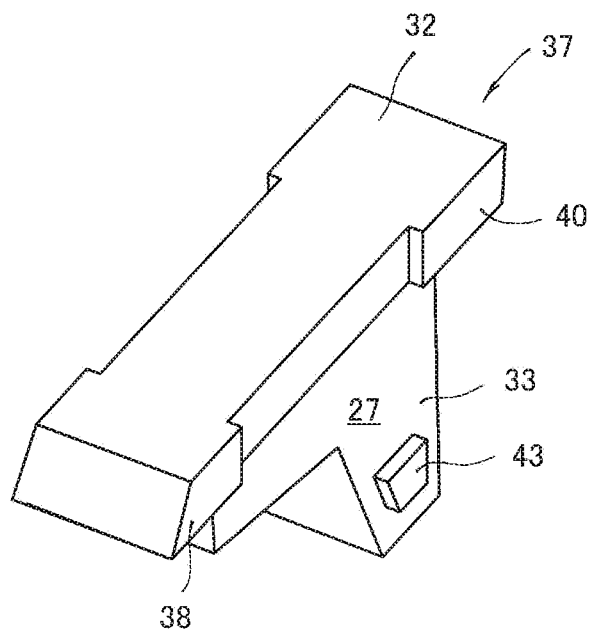
FIGS. 6A and 6B are a perspective view of a rigidity-imparting member employed in one or more embodiments of the present invention, and a side view thereof, in which a swollen portion is indicated by hatching.
Figure 6B:
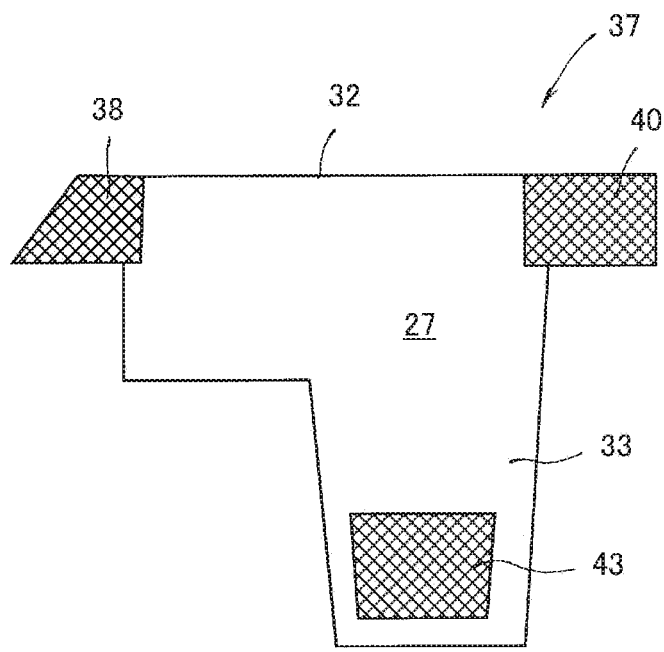

In a fitting member 37 shown in FIG. 6, only both ends 38 and 40 on the long side of the upper side of the horizontal base part 32, and a portion 43 (portion indicated by hatching in FIG. 6B) of the support base part 33 are widely molded. That is, in the fitting member 37 shown in FIG. 6, a projecting part is located on both of the ends 38 and 40 on the long side of the upper side of the horizontal base part 32, and the portion 43 (portion indicated by hatching in FIG. 6B) of the support base part 33.

Figure 7A:
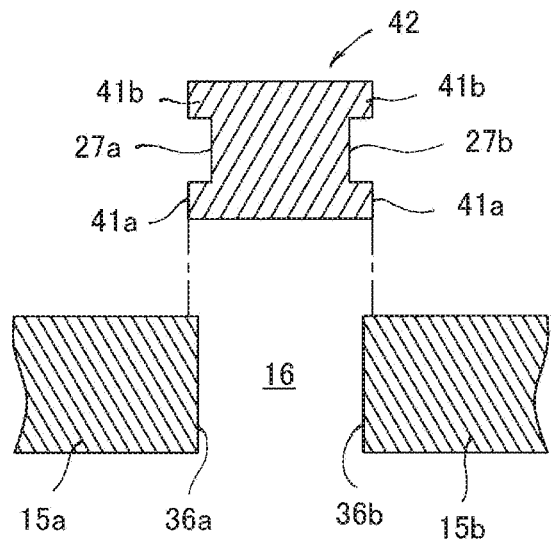
FIGS. 7A to 7C are cross-sectional views showing the vicinity of a missing part when a fitting member is mounted in the missing part of an outer-shell-configuring part in a process of manufacturing a foam molding article according to one or more embodiments of the present invention.
Figure 7B:
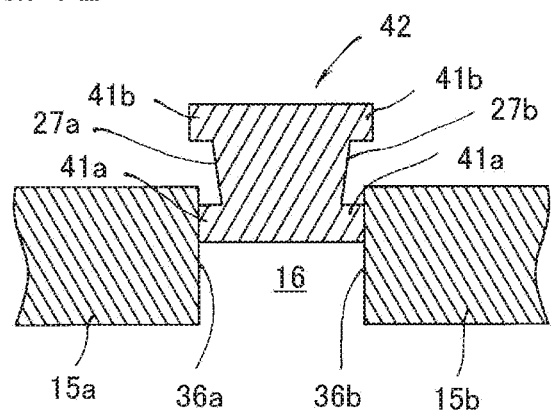
Figure 7C:
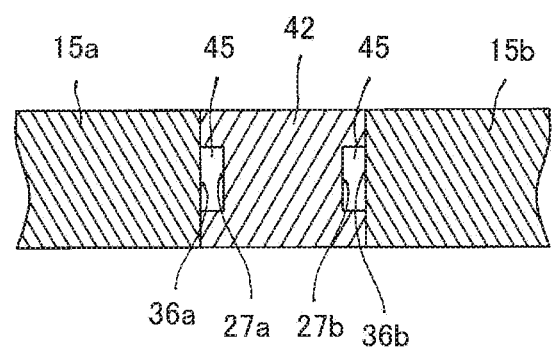

Furthermore, as in a fitting member 42 shown in FIG. 7, a convex part 41 may be provided in a scattered form. When a wide region is partially provided or the convex part 41 is provided, a gap 45 can be formed between the end faces 27a and 27b of the fitting members 35, 37, and 42 and the end faces 36a and 36b of the divided foam pieces 15a and 15b, as in FIG. 7C. On the other hand, the convex part 41 and the like strongly presses the end faces 36a and 36b of the divided foam pieces 15a and 15b, and deforms the end faces 36a and 36b of the divided foam pieces 15a and 15b, whereby the fitting member 42 can be firmly installed in the missing part 16.

FIG. 7 shows a state where the fitting member 42 is pressed into the missing part 16 and is mounted. In the initial stage of insertion, as shown in FIG. 7B, only a convex part 41a on the lower side is in close contact with the end faces 36a and 36b of the divided foam pieces 15a and 15b. In the initial stage of insertion, only the convex part 41a on the lower side is in close contact with the end faces 36a and 36b of the divided foam pieces 15a and 15b, whereby the subsequent pushing force may be small.

Ultimately, as shown in FIG. 7C, a convex part 41b on the upper side is also in close contact with the end faces 36a and 36b of the divided foam pieces 15a and 15b. However, in a portion where the convex part 41 is not present, the gap 45 can be formed as shown in FIG. 7C.

The ratio of the total area of the projecting part such as the convex part 41 to the area of the end faces 27a and 27b of the fitting members 35, 37, and 42 is determined by the shapes and the like of the end faces 36a and 36b of the divided foam pieces 15a and 15b, whereby the ratio cannot be completely determined, but the projecting part can be installed and locked without dropping off, for example, if the ratio is about 10 to 60%, and preferably about 20 to 40% of the surface in contact with the foam.

In one or more embodiments the partially widened region can be easily realized by molding or cutting work such that irregularities can be preliminarily formed on the surface.

In one or more embodiments, the convex part 41 and the like are provided on the end faces of the end faces 27a and 27b of the fitting members 35, 37, and 42, but a projection and the like may be provided on the body side foam member 10 side.

It is also possible to propose so-called taper work in which the entire fitting member 76 is tapered along the fitting direction as a method for facilitating installation.

Figure 8A:
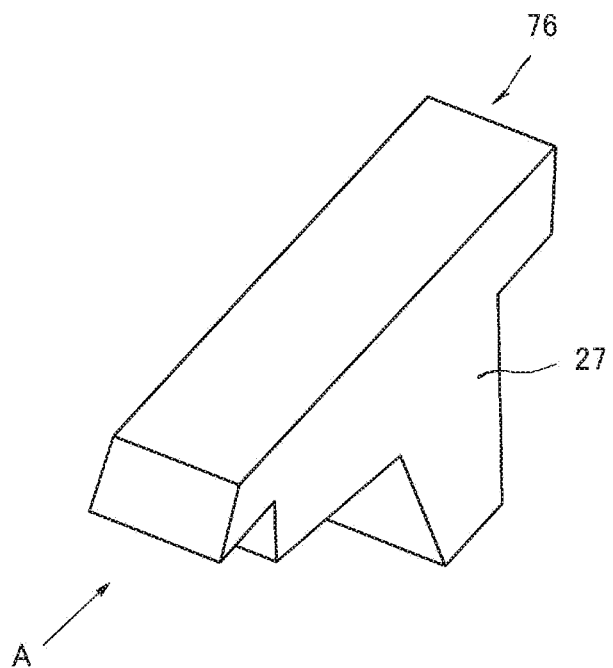
FIGS. 8A and 8B are a perspective view of a rigidity-imparting member employed in a foam molding article according to one or more embodiments of the present invention, and an arrow view in a direction A thereof.
Figure 8B:
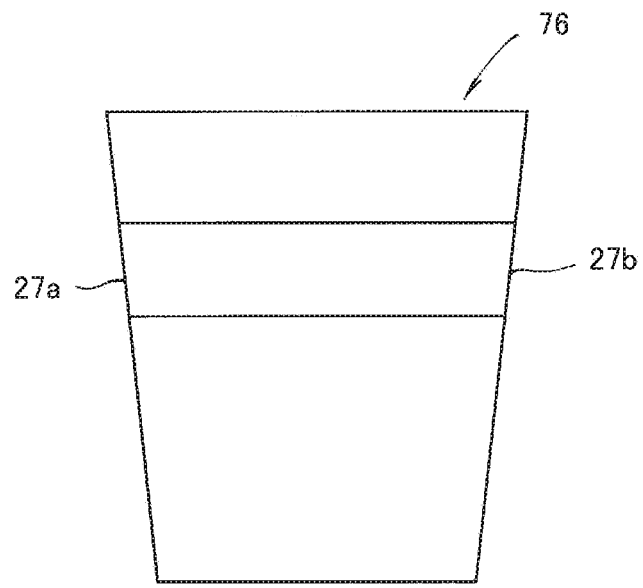
Figure 9A:
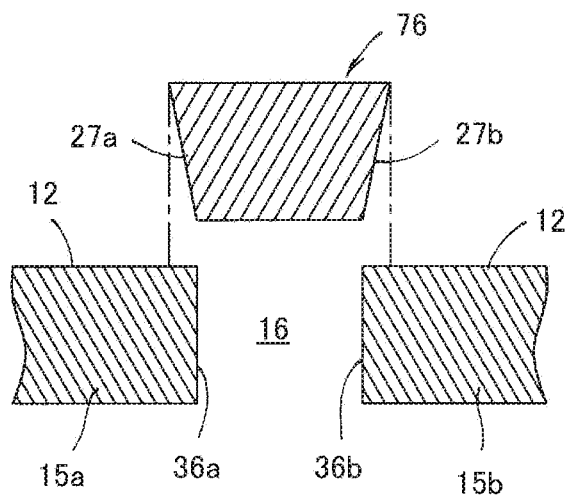
FIG. 9A to 9C are cross-sectional views showing the vicinity of a missing part when a fitting member is mounted in the missing part of an outer-shell-configuring part in the manufacturing process of the foam molding article of FIG. 8.
Figure 9B:
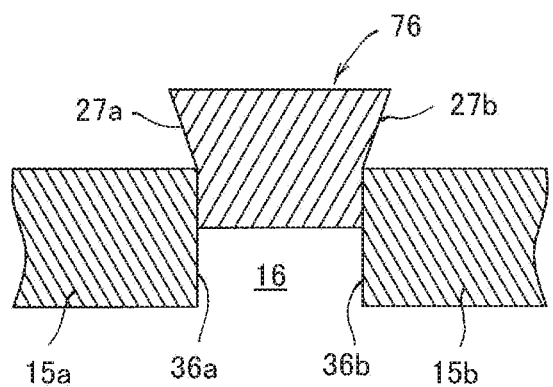
Figure 9C:
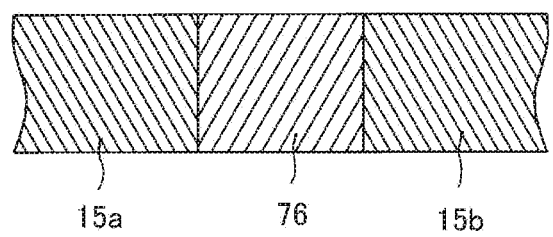

In one or more embodiments, as shown in FIGS. 8 and 9, the cross-sectional shape (hereinafter referred to as a front face shape) cut in parallel with the long sides 25a and 25b of the body side foam member 10 of the fitting member 76 is a trapezoid, and the end faces 27a and 27b of the fitting member 76 are tapered inclined surfaces as a whole.

Herein, the fitting member 76 employed in one or more embodiments has a trapezoidal front shape, and the end faces 27a and 27b of the fitting member 76 are tapered inclined surfaces as a whole, whereby, as shown in FIG. 9A, the fitting member 76 is easily inserted when the fitting member 76 is fitted from the surface side of the horizontal base part 12 of the body side foam member 10. The end faces 27a and 27b of the fitting member 76 are in close contact with the end faces 36a and 36b of the divided foam pieces 15a and 15b by a wedge effect, and are physically engaged with the foam constituting the body side foam member 10. Therefore, the fitting member 76 is not easily detached from the missing part 16.

In one or more embodiments, the fitting member 76 is formed in a tapered shape, but a tapered shape may be formed on the missing part 16 side, and a tapered shape may be formed on both the fitting member 76 and the missing part 16.

Figure 10:
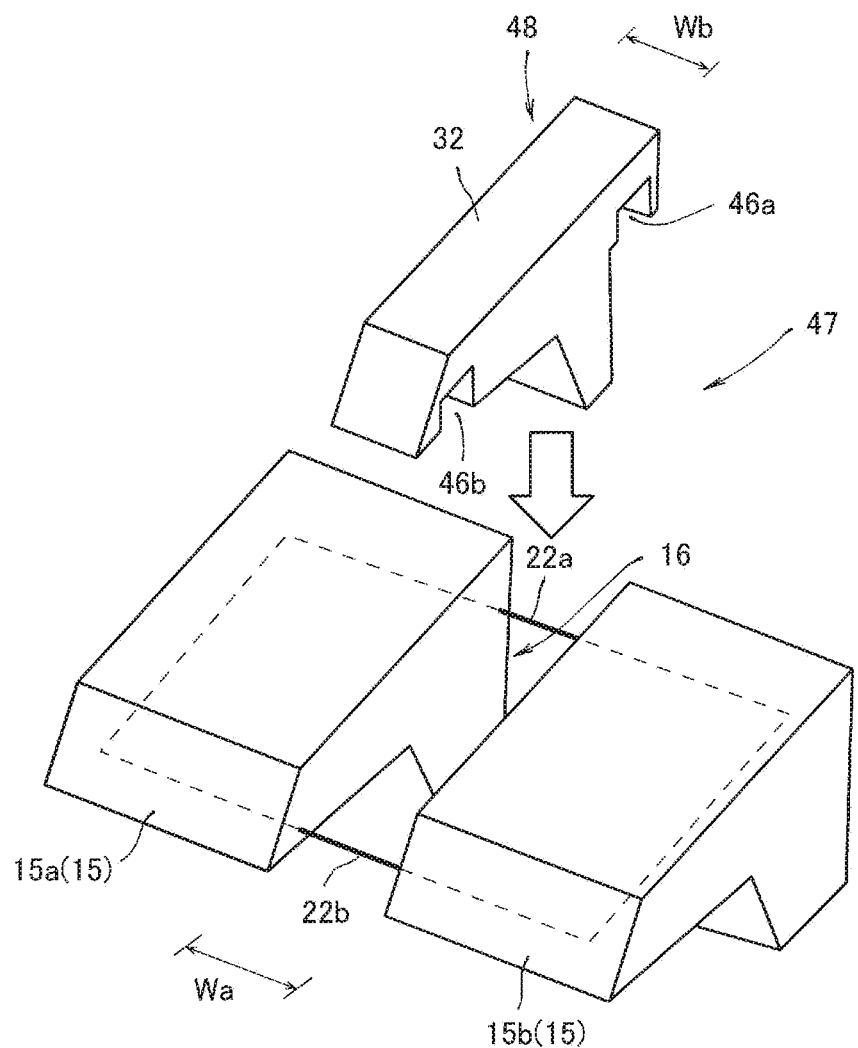
FIG. 10 is an exploded perspective view of a foam molding article according to one or more embodiments of the present invention.

As another example, it is also preferable that a part of a fitting member is physically engaged with, and fixed to an insert 11 exposed as shown in FIG. 10. When this configuration is employed, the width Wb of a fitting member 48 may be slightly smaller than the width Wa of a missing part 16. Of course, the fitting member 48 may be physically engaged with both a body side foam member 10 and the insert 11 in combination with the above-described configuration.

In a foam molding article 47 shown in FIG. 10, engagement parts 46a and 46b are provided on the lower surface of the horizontal base part 32 of the fitting member 48. The engagement parts 46a and 46b extend in a direction along long sides 22a and 22b of the insert 11.

Figure 11:
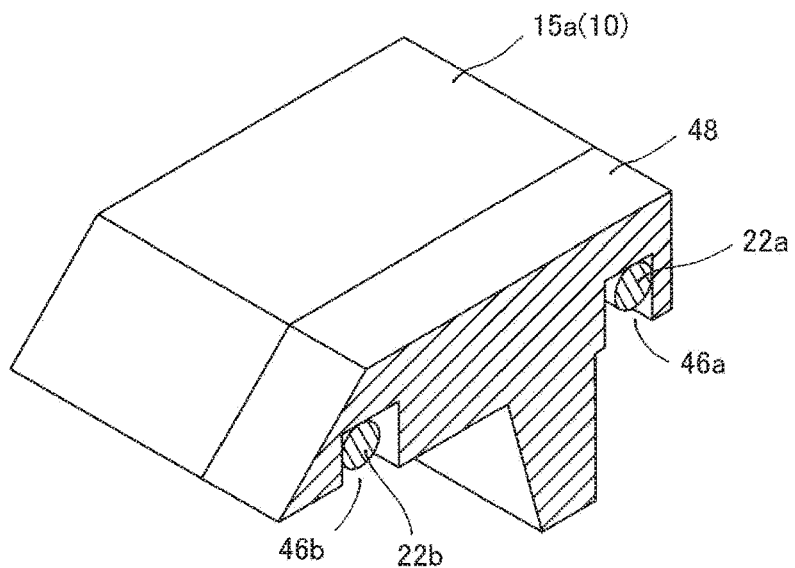
FIG. 11 is a perspective cross-sectional view of the foam molding article of FIG. 10.

In one or more embodiments, when the fitting member 48 is inserted into the missing part 16, as shown in FIG. 11, the long sides 22a and 22b of the insert 11 are engaged with the engagement parts 46a and 46b, to prevent the fitting member 48 to drop off.

In this case, the fitting member 48 is engaged with the exposed insert 11, and retained on the body side foam member 10. For this purpose, a locking shape may be preliminarily formed on the relevant portion of the fitting member 48 so as to fit the insert 11.

The shapes of the engagement parts 46a and 46b are preferably made slightly smaller than the width of the insert 11 (the diameter in the case of the round cross section) so as to securely lock the insert 11 or prevent the insert 11 from dropping off.

The engagement parts 46a and 46b shown in FIG. 10 have a groove shape, and the groove-shaped opening may be narrowed such that the inside of the groove-shaped opening is wider than the opening.

FIGS. 12 to 15 show modification examples of the fitting member.

Figure 12:
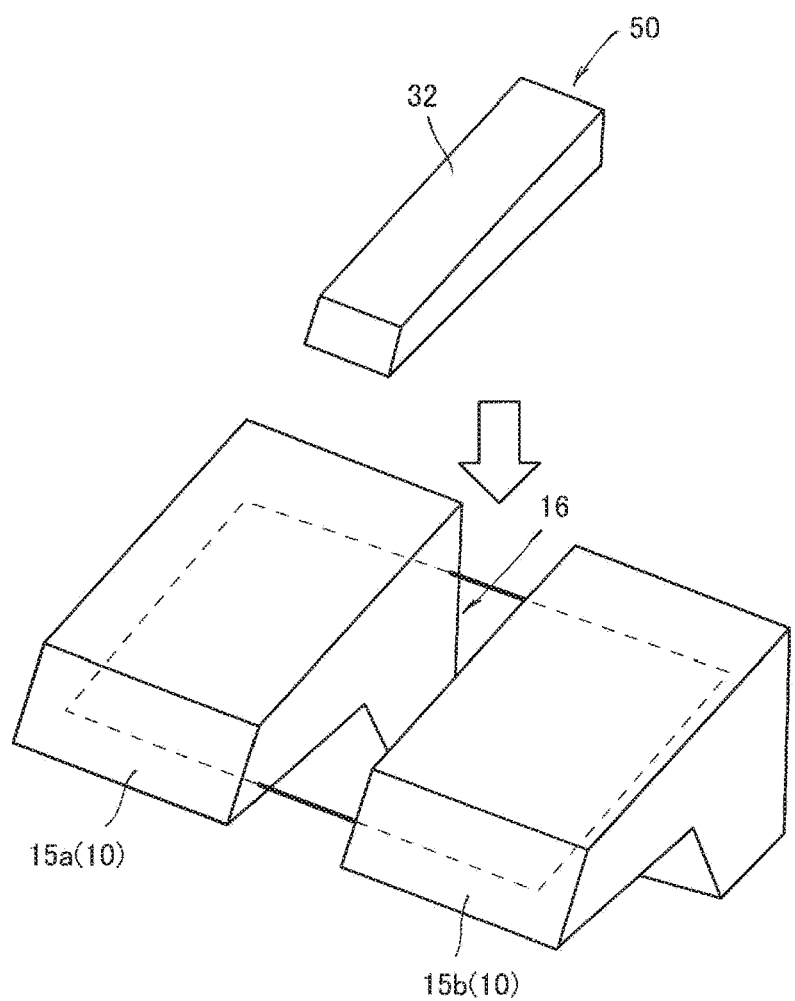
FIG. 12 is an exploded perspective view of a foam molding article according to one or more embodiments of the present invention.

A fitting member 50 shown in FIG. 12 includes only a portion corresponding to a horizontal base part 32, and includes no portion corresponding to a support base part 33.

Figure 13:
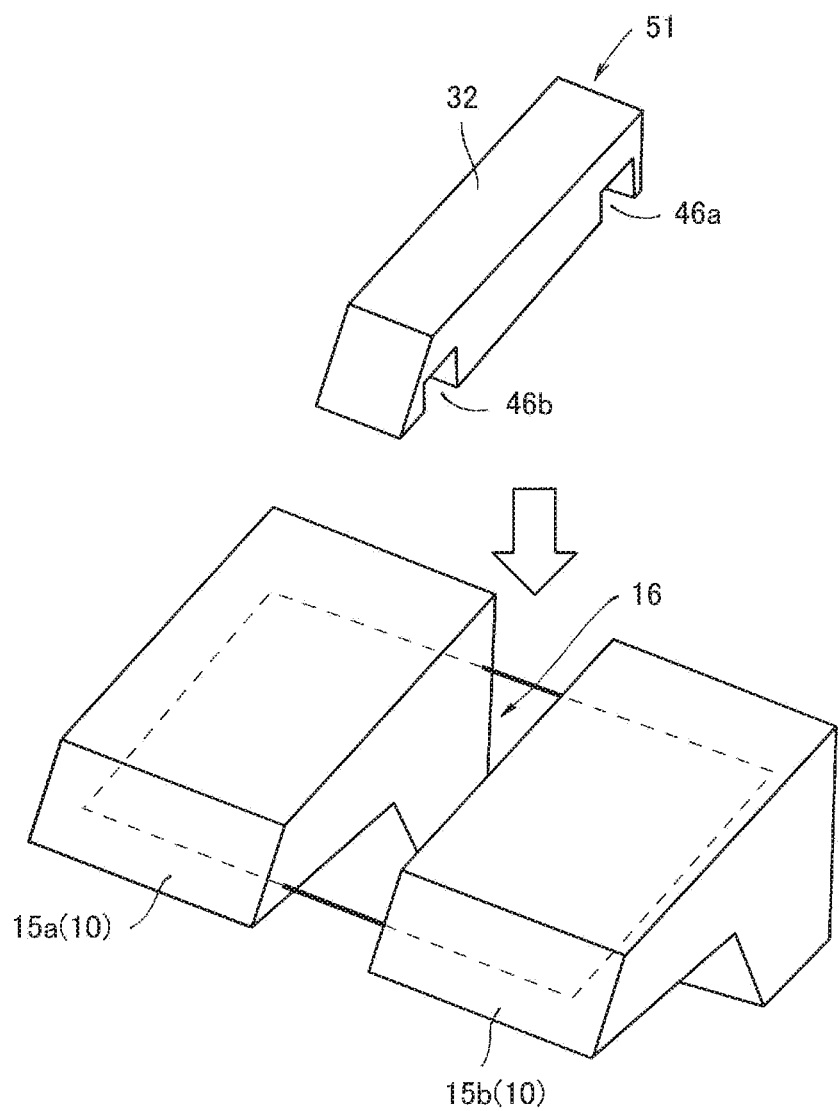
FIG. 13 is an exploded perspective view of a foam molding article according to one or more embodiments of the present invention.

FIG. 13 shows an example in which a fitting member 51 includes engagement parts 46a and 46b provided on the lower surface of a horizontal base part 32 and includes no support base part.

Figure 14:
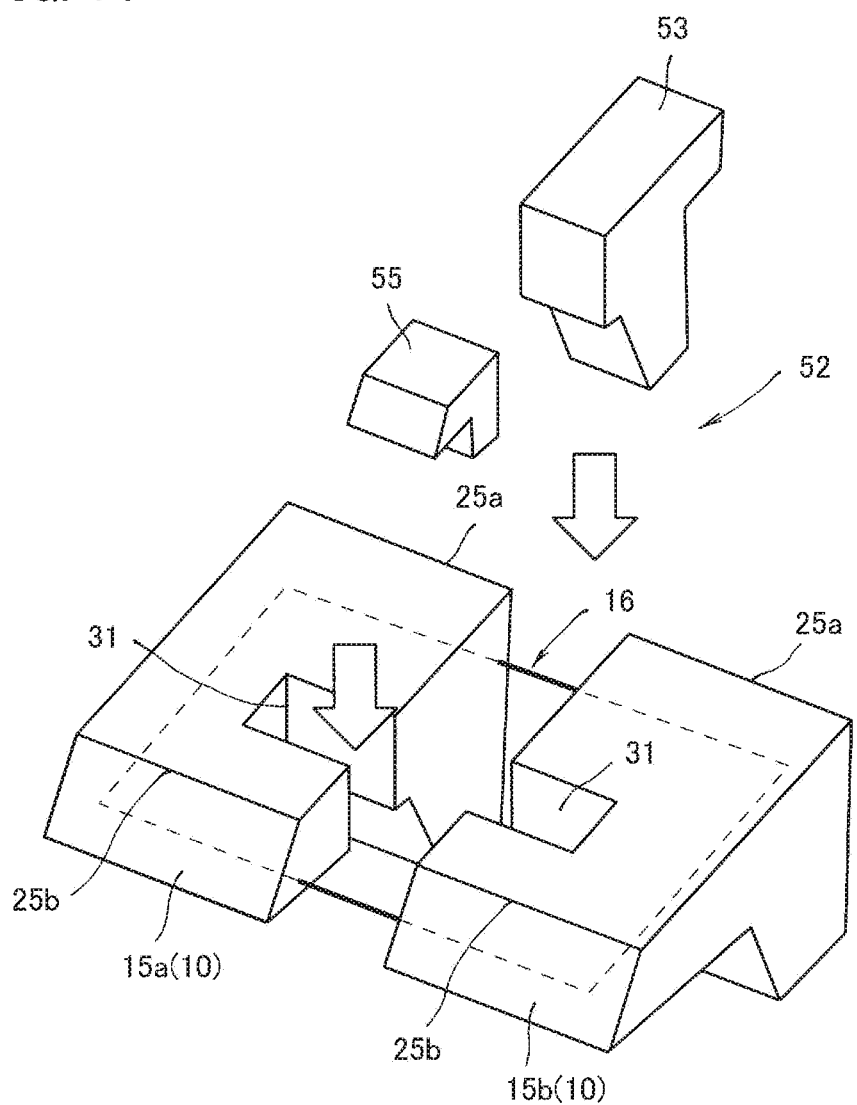
FIG. 14 is an exploded perspective view of a foam molding article according to one or more embodiments of the present invention.

A foam molding article 52 shown in FIG. 14 has an opening in the center as a form at the time of completion. Each of divided foam pieces 15a and 15b constituting a body side foam member 10 of the foam molding article 52 includes a notch part 31 on an end face thereof.

A fitting member is separated into two parts, and includes a rear side fitting member 53 mounted in one long side 25a side of the body side foam member 10 and a front side fitting member 55 mounted in the other long side 25b side.

Figure 15:
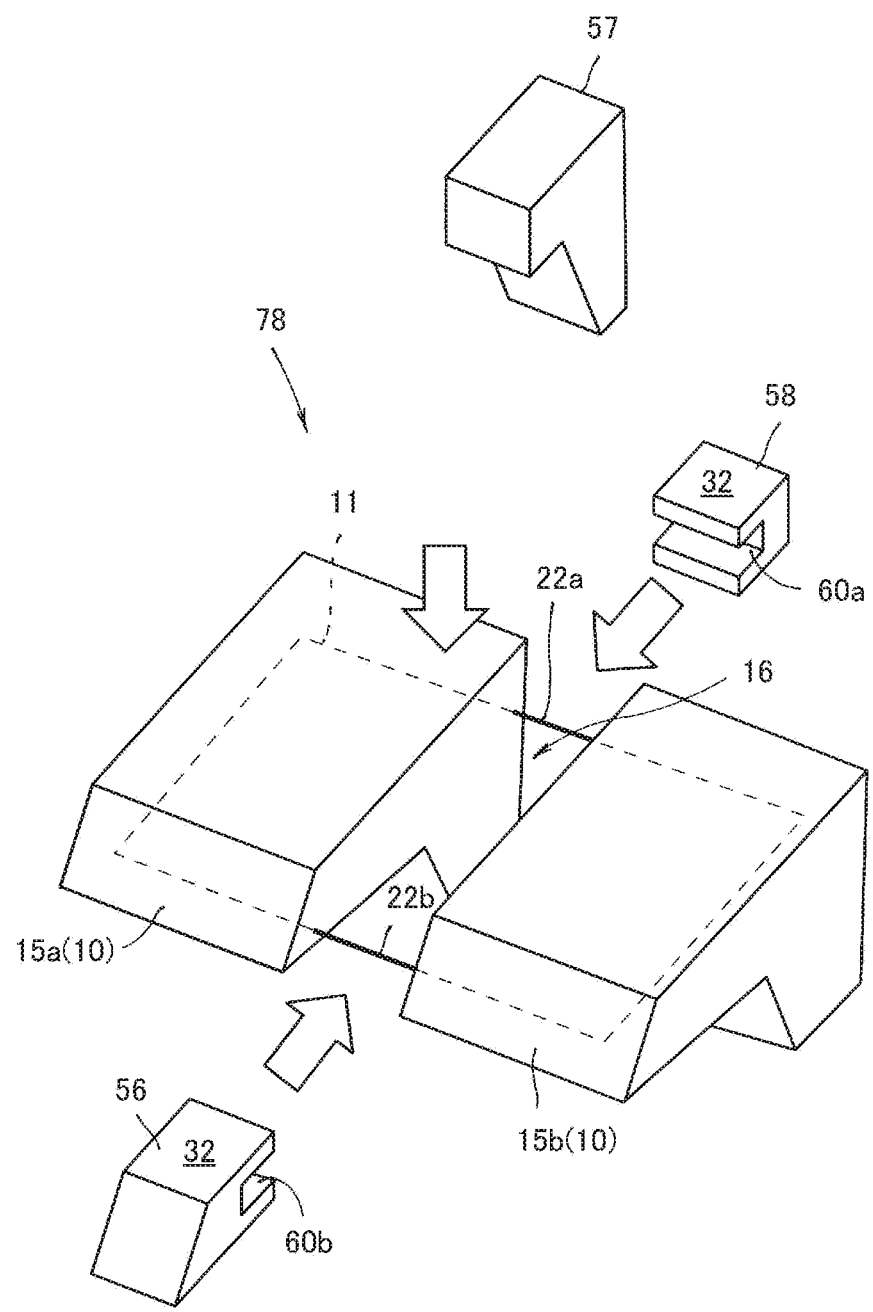
FIG. 15 is an exploded perspective view of a foam molding article according to one or more embodiments of the present invention.

FIG. 15 shows a case where a foam molding article 78 includes a fitting member having a three-piece structure. In the foam molding article 78, the fitting member includes a front side fitting member 56, a central fitting member 57, and a rear side fitting member 58.

The fitting member includes engagement parts 60a and 60b, and has a structure for engaging the engagement parts 60a and 60b with long sides 22a and 22b of an insert 11 to prevent the fitting members 56, 57, and 58 from dropping off.

Herein, in one or more embodiments, the front side fitting member 56 is provided with the engagement part 60b, and the rear side fitting member 58 is provided with the engagement part 60a.

In one or more embodiments, the engagement parts 60a and 60b are grooves extending in a direction parallel to a horizontal base part 32. In one or more embodiments, as shown by arrows in FIG. 15, the front side fitting member 56 and the rear side fitting member 58 are moved in a direction parallel to the horizontal base part 32 and mounted in a missing part 16.

In one or more embodiments, the body side foam member 10 is separated into the two divided foam pieces 15a and 15b, but it may be separated into many divided foam pieces.

The two divided foam pieces 15a and 15b have the same size, and the missing part 16 is provided at the center in the width direction of the body side foam member 10, but the sizes of the divided foam pieces 15a and 15b may be different. In this case, the missing part 16 is provided at a position away from the center.

In one or more embodiments, the body side foam member 10 is separated into the divided foam pieces 15a and 15b by a straight line parallel to the short sides 23a and 23b of the insert 11, but the body side foam member 10 may be separated by an oblique line or a curved line. The body side foam member 10 may be separated in the direction parallel to the long sides 22a and 22b of the insert 11, or may be separated into a cross shape.

In one or more embodiments, the missing part 16 is located at a position corresponding to the long sides 22a and 22b of the insert 11, and is sized so as to straddle the two long sides 22a and 22b, but it may be located and sized so as to correspond to any one of the long sides 22a and 22b or only the short sides 23a and 23b.

In one or more embodiments, the insert 11 is made of an iron-based bar-like member. In the divided foam pieces 15a and 15b, the expanded particles of an olefin-based resin are expanded in a mold for use in molding by heating to enclose the periphery of the insert 11.

However, the bond strength between the iron-based insert 11 and the olefin-based foam is weak, whereby the interface is relatively moved. However, the insert 11 has a quadrangular annular shape, and has two long sides 22a and 22b and two short sides 23a and 23b. The whole areas of the short sides 23a and 23b are embedded in the divided foam pieces 15a and 15b.

Herein, the short sides 23a and 23b of the insert 11 are bent with respect to the long sides 22a and 22b at the end parts of the long sides 22a and 22b. Therefore, when the long sides 22a and 22b of the insert 11 are pressed or pulled in an axial direction as shown by the arrow X in FIG. 1, the short sides 23a and 23b of the insert 11 are physically engaged with the foam in the divided foam pieces 15a and 15b to prevent the relative movement of the long sides 22a and 22b.

Thus, the insert 11 employed in one or more embodiments includes engagement parts (short sides 23a and 23b) engaged with the foam in the divided foam pieces 15a and 15b. The long sides 22a and 22b of the insert 11 function as a connecting part connecting the engagement parts (short sides 23a and 23b).

When viewed from another perspective, the long sides 22a and 22b of the insert 11 are engagement parts, and the short sides 23a and 23b function as a connecting part connecting the engagement parts.

As described in the section of Background Art, the body side foam member 10 employed in one or more embodiments is also produced by mounting the insert 11 in a mold for use in molding, introducing expanded particles into a cavity of the mold for use in molding, and foaming the expanded particles in the cavity to integrate the insert 11 with the foam.

However, as shown in FIG. 3, the body side foam member 10 employed in one or more embodiments is separated into a plurality of divided foam pieces 15a and 15b, and the adhesive force between the insert 11 and the foam is weak, whereby the interface is relatively moved. Therefore, even if the volumes of the divided foam pieces 15a and 15b are changed in a direction along the long sides 25a and 25b, no stress is applied to the insert 11. Conversely, when the volume of the outer-shell-configuring part 6 is changed, the missing part 16 is formed at a position at which a stress applied to the insert 11 can be alleviated.

For this reason, warp is less likely to occur in any of the foam molding articles 1 of one or more embodiments.

The fitting member 20 is mounted in the missing part 16 in the foam molding articles of one or more embodiments, whereby the foam molding articles have a certain level of integrated feeling even though the body side foam member 10 is separated into the divided foam pieces 15a and 15b. When the foam molding articles are carried, the body side foam member 10 is not loosened. Few defects are present on the surface of the body side foam member 10, whereby, even if the body side foam member 10 is used as a rigidity-imparting member for a seat for an automobile, the body side foam member 10 is less likely to apply an uncomfortable feeling to a person sitting on the seat for an automobile.

In one or more embodiments, the insert 11 includes the short sides 23a and 23b which are the engagement parts engaged with the foam therein. The long sides 22a and 22b are provided as a connecting part connecting the two or more engagement parts (short sides 23a and 23b). In one or more embodiments, the missing part 16 is located in a portion corresponding to the long sides 22a and 22b as the connecting part of the insert 11.

The position of the missing part 16 is not limited to a portion of the long side 22a and 22b as the connecting part of the insert 11, and the missing part 16 may be provided in a portion corresponding to the short sides 23a and 23b as the engagement part.

Figure 16:
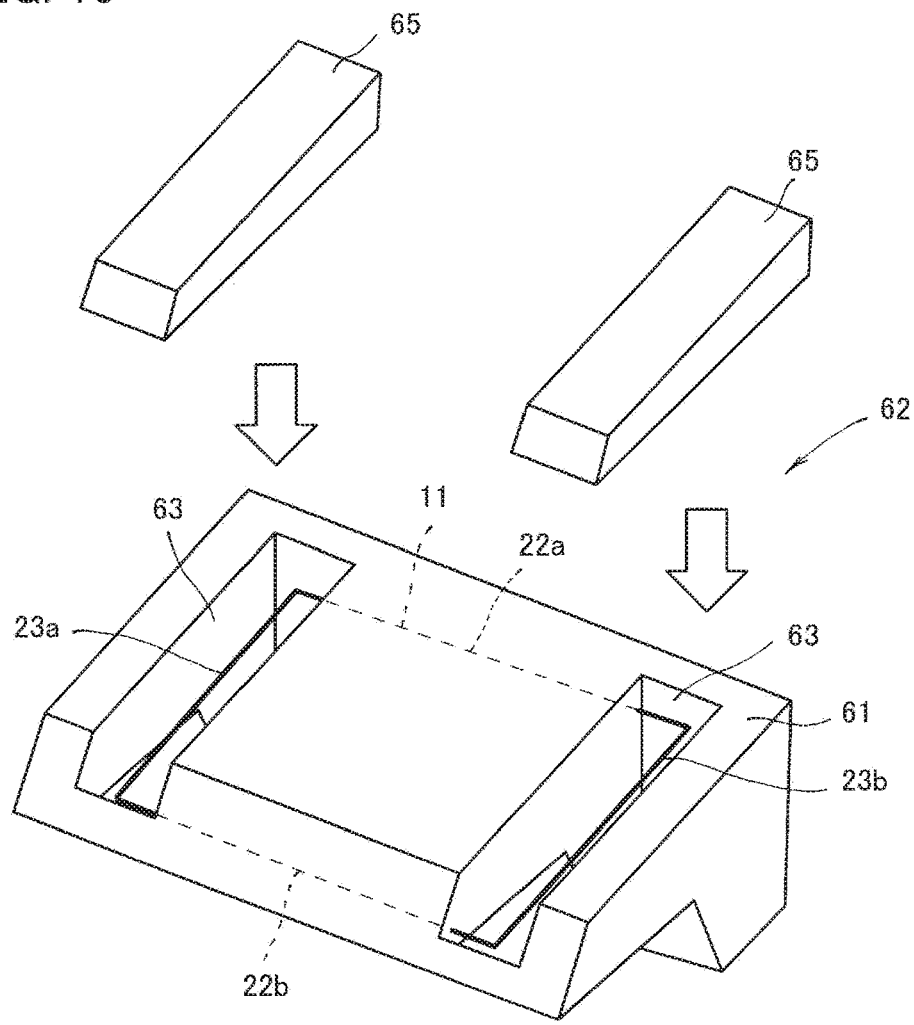
FIG. 16 is an exploded perspective view of a foam molding article according to one or more embodiments of the present invention.
Figure 17:
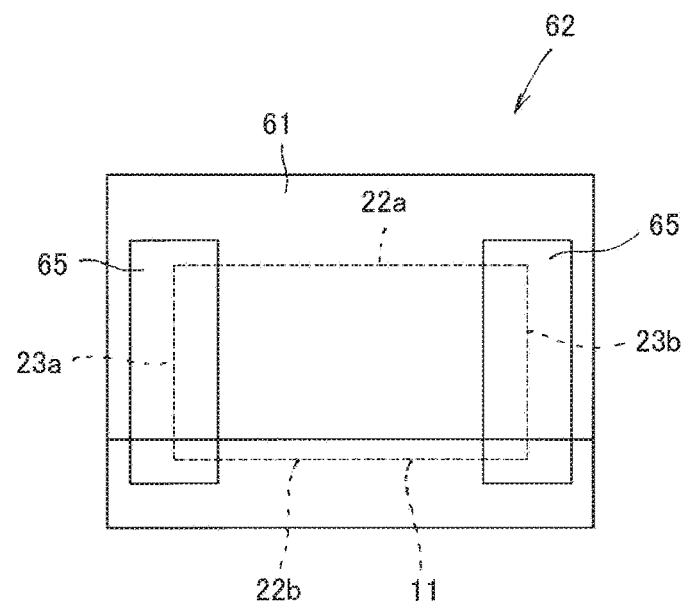
FIG. 17 is a plan view of the foam molding article shown in FIG. 16.

A foam molding article 62 shown in FIGS. 16 and 17 includes a slit-like missing part 63 having a width larger than the diameters of the short sides 23a and 23b of the insert 11 in a region including all of the short sides 23a and 23b as the engagement part of the insert 11. In the missing part 63, the short sides 23a and 23b of the insert 11 are exposed.

The missing part 63 employed in one or more embodiments has a width larger than the diameter of the short sides 23a and 23b of the insert 11, whereby the short sides 23a and 23b can be moved toward the long sides 22a and 22b of the insert 11.

Therefore, even if the volume of a body side foam member 61 is changed in the direction along the long sides 25a and 25b, no stress is applied to the insert 11. Also in one or more embodiments, the missing part 63 is formed at a position where a stress applied to the insert 11 can be alleviated when the volume of the body side foam member 61 is changed.

Also in the foam molding article 62 shown in FIG. 16, a fitting member 65 is mounted in the missing part 63.

Figure 18:
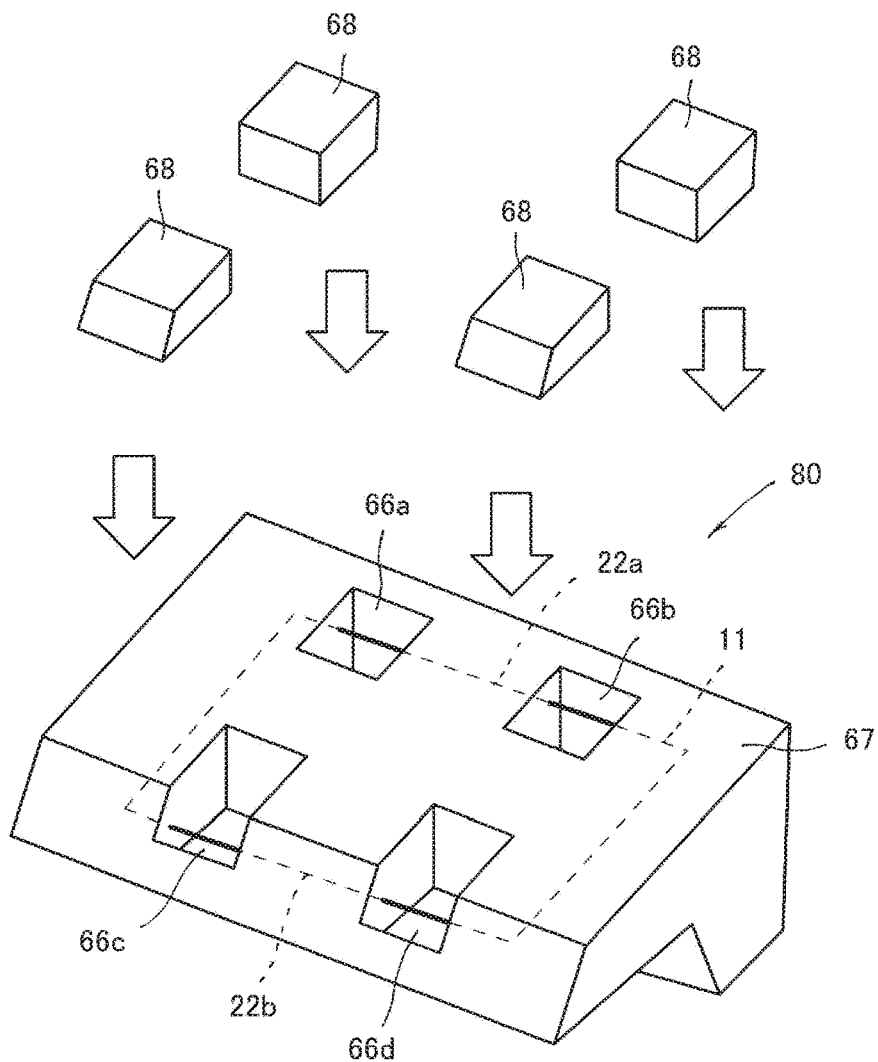
FIG. 18 is an exploded perspective view of a foam molding article according to one or more embodiments of the present invention.
Figure 19:
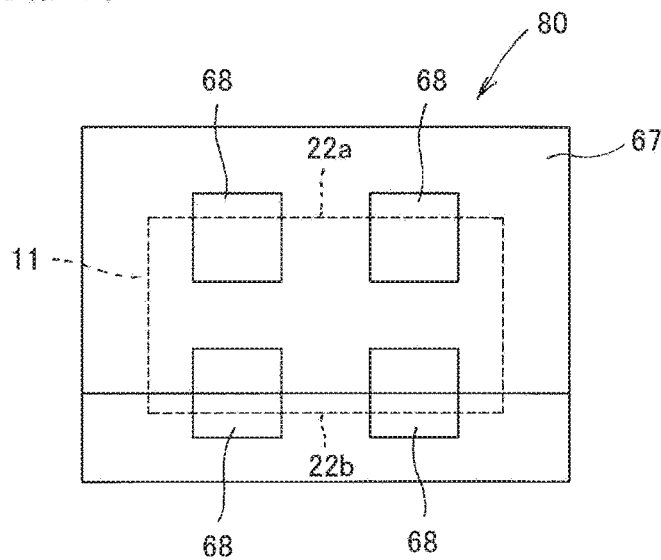
FIG. 19 is a plan view of the foam molding article shown in FIG. 18.

In a foam molding article 80 of one or more embodiments shown in FIGS. 18 and 19, missing parts 66a and 66b are formed in a region corresponding to one long side 22a as a connecting part of an insert 11. Missing parts 66c and 66d are also formed in a region corresponding to the other long side 22b. In the missing part 66, the long sides 22a and 22b of the insert 11 are exposed.

Figure 20B:
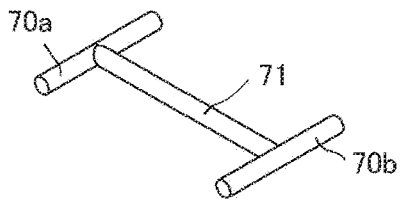
Figure 20C:
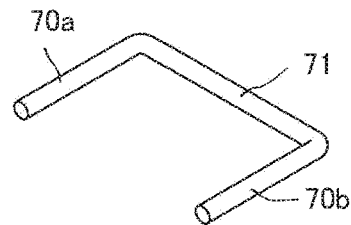
Figure 20D:
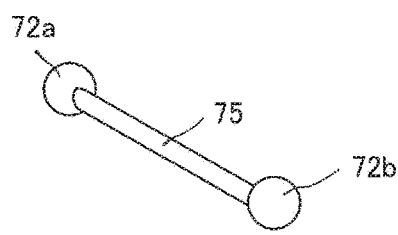
Figure 20E:
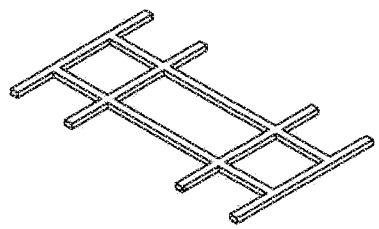
Figure 20F:
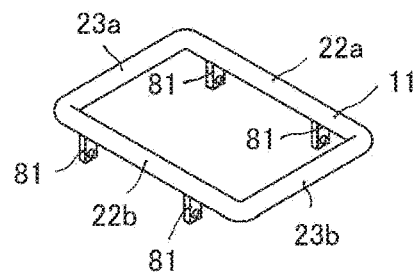

One or more embodiments relate to the case where an attachment tool 81 for joining the foam molding article 80 to the other member as shown in FIG. 20F is provided on the insert 11. An example of the attachment tool 81 is a skin layer attachment tool.

It is desirable that the missing parts 66a and 66b provided in the foam molding article 80 are substantially through holes, and the attachment tool 81 is exposed in the through hole. The attachment tool 81 substantially functions as an engagement part engaged with the foam. The position of the missing part 16 is a portion corresponding to the attachment tool 81 as the engagement part of the insert 11.

In one or more embodiments, the missing parts 66a, 66b, 66c, and 66d are independent from each other without being communicated with each other. Therefore, when the volume of a body side foam member 67 is changed in a direction along the long sides 25a and 25b, a stress is applied to the insert 11. However, a portion where the foam is missing is located in the intermediate part of the body side foam member 67, whereby the elastic coefficient of the body side foam member 67 itself is small, and a stress applied to the insert 11 is small.

Also in the foam molding article 80 of one or more embodiments, a fitting member 68 is mounted in each of the missing parts 66a, 66b, 66c, and 66d.

In one or more embodiments, the insert 11 has a quadrangular ring shape, but the present invention is not limited to this configuration, and the insert may have a circular or elliptical shape. The shape of the insert 11 is not limited to an annular shape. As shown in FIG. 20B, lateral rod parts 70a and 70b as engagement parts are located at both ends, and a vertical rod part 71 as a connecting part connecting the lateral rod parts 70a and 70b may be provided between the centers of the lateral rod parts 70a and 70b.

As shown in FIG. 20C, the vertical rod part 71 may connect the end parts of the lateral rod parts 70a and 70b to each other to provide a "U" shape.

As shown in FIG. 20D, massive parts 72a and 72b as engagement parts are provided at both ends, and a vertical rod part 75 may be provided as a connecting part connecting the massive parts 72a and 72b.

As shown in FIG. 20E, the insert 11 may have a lattice shape.

As shown in FIG. 20F, an attachment tool 81 for joining the other member and the foam molding article 1 may be provided.

The material of the insert 11 is not limited to an iron-based material (including stainless steel), and may be other metal such as aluminum or its alloy, titanium, or copper. The material of the insert 11 may be a resin.

In one or more embodiments, the fitting member 20 is basically produced in a fitting member molding step different from that of the body side foam member 10. In many cases, the fitting member 20 is molded by another molding apparatus at another place, and produced in bulk.

On the other hand, the body side foam member 10 is molded in a body part molding step. In the body molding step, the whole or a part of the insert is embedded in the massive body side foam member 10 which is made of an olefin-based resin, and the formed body side foam member 10 including the missing part 16 in which the foam is missing is molded in the intermediate part of the body side foam member 10.

Specifically, the insert 11 is mounted in a foam mold for use in molding (not shown) having a convex die and a concave die. Between the convex die and the concave die, a molding cavity forming one divided foam piece 15a and a molding cavity forming the other divided foam piece 15b are present.

Preformed beads are filled in the two molding cavities, and then the convex die and the concave die are completely closed.

In a state where the convex die and the concave die are completely closed, water vapor of about 0.10 to 0.40 MPa (G) is supplied to the molding cavity through a concave chamber (not shown), and the expanded particles are foamed by heating, and fusion-bonded to mold the two independent divided foam pieces 15a and 15b.

In one or more embodiments, after the expanded particles are foamed by heating, and fusion-bonded, cooling water is sprayed from a rear side to the concave and convex dies to cool the divided foam pieces 15a and 15b, and the concave die and the convex die are then opened, whereby the whole or a part of the insert 11 is embedded in the body side foam member 10, and the missing part 16 in which the foam is missing is obtained in the intermediate part of the body side foam member 10.

After demolding, the divided foam pieces 15a and 15b once shrink, and then return to the original shape.

In one or more embodiments the fitting member 20 is mounted in the missing part 16 of the body side foam member 10 to complete the foam molding article 1.

Herein, it is preferable that the fitting member 20 is fitted after the body side foam member 10 is dried. That is, as described above, the divided foam pieces 15a and 15b are cooled and temporarily shrink, and then the volume is recovered.

While the divided foam pieces 15a and 15b slightly shrink immediately after molding, the fitting member 20 has a high probability of being more likely to be fitted. By fitting the fitting member 20 before drying, the fitting member and a part of the foam are in contact with each other by a dimensional recovery behavior accompanying drying, and the recovery behavior is regulated, whereby the warp may not be sufficiently recovered.

Thus, the volume of the body side foam member 10 is changed after molding, whereby it is desirable that the volume change of the body side foam member 10 converges after the body part molding step, and the fitting member 20 is then mounted in the missing part 16.

By fitting the fitting member of one or more embodiments of the present invention, overall rigidity is secured even in a divided molded article, and the difference in seating comfort depending on a place may be less likely to occur even in an application such as a core of a seat for an automobile.

In one or more embodiments, the divided foam pieces 15a and 15b are molded using a polyolefin-based resin as a material. The polyolefin-based resin constituting the divided foam pieces 15a and 15b is a polymer containing 75% by weight or more of an olefin-based monomer.

Specific examples of the olefin-based monomer include α-olefins of 2 to 12 carbon atoms such as ethylene, propylene, butene-1, isobutene, pentene-1,3-methyl-butene-1, hexene-1,4-methyl-pentene-1, 3,4-dimethyl-butene-1, heptene-1,3-methyl-hexene-1, octene-1, and decene-1. These may be used alone or in combination of two or more.

Specific examples of other monomers copolymerizable with the olefin-based monomer include cyclic olefins such as cyclopentene, norbornene, and 1,4,5,8-dimethano-1,2,3,4, 4a,8,8a, 6-octahydronaphthalene, and dienes such as 5-methylene-2-norbornene, 5-ethylidene-2-norbornene, 1,4-hexadiene, methyl-1,4-hexadiene, and 7-methyl-1,6-octadiene. These may be used alone or in combination of two or more.

Specific examples of the polyolefin-based resin include a polyethylene-based resin composed mainly of ethylene such as high-density polyethylene, medium-density polyethylene, low-density polyethylene, or linear low-density polyethylene, and a propylene-based resin composed mainly of propylene. These polyolefin-based resins may be used alone or in combination of two or more.

The polypropylene-based resin is not particularly limited as long as it contains propylene as a main component of a monomer, and examples thereof include a propylene homopolymer, an olefin-propylene random copolymer, and an olefin-propylene block copolymer. These may be used alone or in combination of two or more.

Examples of the polyethylene-based resin used in one or more embodiments include ethylene homopolymers, ethylene-α-olefin random copolymers, ethylene-α-olefin block copolymers, low-density polyethylene, high-density polyethylene, and linear low-density polyethylene. Examples of the α-olefin herein include α-olefins having 3 to 15 carbon atoms, which may be used alone or in combination of two or more.

Among these polyethylene-based resins, an ethylene-α-olefin block copolymer with a non-ethylene comonomer content of 1 to 10% by weight or linear low-density polyethylene has good foamability and may be suitably used for in-mold foam molding.

If necessary, the polyolefin-based resin used in one or more embodiments of the present invention may be mixed with an additive such as a cell nucleating agent (such as talc); a stabilizer (such as an antioxidant, a metal deactivator, a phosphorus-based process stabilizer, an ultraviolet absorber, an ultraviolet stabilizer, a fluorescent brightening agent, or a metallic soap); a crosslinking agent, a chain transfer agent, a lubricant, a plasticizer, a filler, a reinforcing agent, an inorganic pigment, an organic pigment, a conductive modifier, a flame-retardant modifier, a surfactant, or a polymer antistatic agent.

Usually, the polyolefin-based resin composition used in one or more embodiments is preliminarily melt-mixed together with the additive, if necessary, using an extruder, a kneader, a Banbury mixer, and a roll and the like so as to be easily utilized for pre-foaming, and the mixture is molded into polyolefin-based resin particles each having a desired shape such as a cylindrical, oval, spherical, cubic, or rectangular solid shape.

The method for manufacturing polyolefin-based resin expanded particles used in one or more embodiments is not particularly limited, and a so-called decompression foaming method is preferable, which includes dispersing the polyolefin-based resin particles and a dispersing agent and the like in a dispersion medium under the presence of a foaming agent in a closed vessel, impregnating the foaming agent into the resin particles while heating the dispersion to a predetermined foaming temperature under increased pressure, and then foaming the dispersion by releasing it from the closed vessel to a low-pressure region while keeping the temperature and pressure constant in the vessel.

In one or more embodiments the heating temperature in the closed vessel is preferably in a range from the temperature lower by 25° C. than the melting point of the polyolefin-based resin particles to the temperature higher by 25° C. than the melting point of the polyolefin-based resin particles, and more preferably in a range from the temperature lower by 15° C. than the melting point of the polyolefin-based resin particles to the temperature higher by 15° C. than the melting point of the polyolefin-based resin particles. The polyolefin-based resin expanded particles can be manufactured by a process which includes pressurizing the dispersion by heating to impregnate the foaming agent into the polyolefin-based resin particles and then releasing the polyolefin-based resin particles into an atmosphere at a pressure lower than that in the closed vessel by opening one end of the closed vessel.

Examples of the foaming agent for use in the production of the polyolefin-based resin expanded particles include, but are not limited to, aliphatic hydrocarbons such as propane, isobutane, normal butane, isopentane, and normal pentane; inorganic gases such as air, nitrogen, and carbon dioxide; water; and any mixture thereof.

EXAMPLES

Hereinafter, one or more embodiments of the present invention will be described in more detail, but the present invention is not limited to the following embodiments.

Olefin-based foamed resin particles, apparatuses, and methods for evaluating the effects of one or more embodiments of the present invention used in Examples and Comparative Examples will be described below.

(Olefin-Based Foamed Resin Particles)

In Examples and Comparative Examples, propylene-based foamed resin particles Eperan LBS30C manufactured by Kaneka Corporation were used as olefin-based foamed resin particles.

For molding, olefin-based foamed resin particles were pressurized and held in compressed air for 24 hours in a pressurized tank, and a pressure in air bubble was increased to a pressure (about 0.2 MPaG) recommended by Kaneka Corporation, followed by providing for molding.

(Molding Apparatus)

In Examples and Comparative Examples, an in-mold molding machine for olefin foaming resin P300 manufactured by Toyo Machinery & Metal Co., Ltd. was used.

(Molded Article Die)

In Examples, a die for single molded article was used, which showed an approximate dimension of long side of 800 mm (width direction) and a short side of 450 mm (vertical direction), had a substantially L-shaped cross section parallel to the short side (similar to FIG. 1), and had one end of 30 mm on a thinner side and the other end of 55 mm on a thicker side. The die had a structure in which an insert 11 obtained by bending a piano wire having a diameter of 3 mm at an inner side position separated by 10 mm from an outer peripheral edge and at an inner side position separated by 15 mm from a top surface in a thickness direction and welding the joint part of the wire was held by a magnet protruded from the die. The die is separated into right and left parts in a form in which a groove having a width of 40 mm is provided parallel to the short side at the center of the long side. The insert 11 is exposed in the groove portion.

In Comparative Example 1, a die having no groove provided in the die used in Examples was used.

(Fitting Member)

A plate-shaped molded article was obtained with a plate-shaped single molded article die having a long side of 600 mm, a short side of 70 mm, and a thickness of 70 mm, and then cut into a shape so as to be fitted into the groove part with a cutter knife, thereby obtaining a fitting member.

(Drying)

The molded article was removed from the die, then allowed to stand at room temperature for 1 hour, and then placed in a drying chamber at an inside temperature of 80° C. for 24 hours to dry the molded article.

(Evaluation Method)

Evaluation Point 1 Warp Change

The molded article is placed on a horizontal plane with its top face down, and the differences in height of both long side ends (short side center) from the center are measured.

The total value of the measured results of the two points is defined as a warp amount.

For the measurement, a ruler with a minimum scale of 0.5 mm was used.

Evaluation Point 2 Evaluation of Sitting Comfort

For the molded article placed on the horizontal plane, a person sits at three points (the vicinities of both the long side ends and the center) to evaluate feelings.

The feelings were evaluated according to the magnitudes of the feeling differences in the three regions. The term "large" means a greatly different feeling, and the term "small" means a little feeling difference.

Example 1

The insert was preliminarily mounted in the molded article die provided with the groove. The molded article die was filled with olefin-based resin foamed particles. Vapor with a main pipe vapor pressure of 0.6 MPa was guided to the die. The die was subjected to preliminary heating for 3 seconds, one side heating for 5 seconds, reverse side heating for 2.5 seconds, and double-side heating for 11 seconds. Then, there was performed a water cooling step of spraying water adjusted to 40° C. and having a pressure of 0.4 MPa in a mist form from the back of the die to cool the die and the molded article for 105 seconds, followed by an air cooling step for 50 seconds to leave the die without doing anything. Then, the molded article was removed.

The removed molded article was immediately dried in a drying chamber under the above conditions, and then left to stand at room temperature (25° C.) for 8 hours.

Separately, a plate material for a fitting member was molded with a die for the fitting member, and dried in the same manner as above to obtain a plate material, and the fitting member was then cut out to a shape so as to fit the groove shape by a cutter knife. The thickness at that time was made thicker by 0.2 mm than the groove width of the dried molded article.

The fitting member was fitted into the groove part of the molded article and evaluated.

The results will be described as follows.

Evaluation Point 1 The total warp was 2 mm.

Evaluation Point 2 Any particular uncomfortable feeling was not felt at both ends and the center.

Example 2

Evaluation was carried out in the same manner as in Example 1 except that the thickness of a fitting member was made thinner by 4 mm than the groove width of a molded article and a notch groove having a width of 2.8 mm for being engaged with an insert was provided at each of both ends.

The results will be described as follows.

Evaluation Point 1 The total warp was 3 mm, and slightly greater than that of Example 1.

Evaluation Point 2 A large uncomfortable feeling was not felt at each of both ends and the center, but at the center, the remaining groove part was felt by the butt.

Example 3

Evaluation was carried out in the same manner as in Example 1 except that a place where the thickness of a fitting member was made thicker by 0.2 mm than the groove width of a molded article was limited to 50 mm from both ends and a width of 50 mm at the center (the total width was 150 mm, and the total was set to 30% with respect to the overall length of 450 mm).

The results will be described as follows.

Evaluation Point 1 The total warp was 2 mm as in Example 1.

Evaluation Point 2 Any particular uncomfortable feeling was not felt at both ends and the center.

Comparative Example 1

A molded article was obtained by molding and drying in the same manner as in Example 1 except that a die having no groove was used as a die of a molded article. Since the die has no groove, the fitting member is not inserted.

The results of evaluation will be described as follows.

Evaluation Point 1 The total warp was 54 mm.

Evaluation Point 2 There was an uncomfortable feeling in which the feeling of warp was felt in the central part.

Comparative Example 2

A molded article was obtained in the same manner as in Example 1 except that a fitting member was not fitted.

The results of evaluation will be described as follows.

Evaluation Point 1 The total warp was 1 mm or less.

Evaluation Point 2 A groove portion was not supported in a central part with respect to both ends, which caused an uncomfortable feeling. After the evaluation point 2 was evaluated, the end part was moved while the molded article was moved. As a result, the insert was bent in the groove part by the movement, and an unstable behavior restoring when the movement was finished was observed.

Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims.

EXPLANATION OF REFERENCE SIGNS

1, 47, 52, 62, 78, 80: foam molding article
2: seat for an automobile
3: cushion layer
5: skin layer
6: outer-shell-configuring part
10, 61, 67: body side foam member
15*a*, 15*b*: divided foam piece
16, 63, 66: missing part
20, 35, 37, 42, 48, 50, 51, 65, 68, 76: fitting member
46*a*, 46*b*: engagement part
53: rear side fitting member
55: front side fitting member
56: front side fitting member
57: central fitting member
58: rear side fitting member
60*a*, 60*b*: engagement part

What is claimed is:

1. A foam molding article comprising:
   an outer-shell-configuring part;
   an insert; and
   a fitting member,
   wherein the outer-shell-configuring part comprises a body side foam member,
   wherein the insert is at least partially embedded in the body side foam member only,
   wherein the body side foam member comprises a foam and a missing part where a part of the foam is missing,
   wherein the foam is made of an olefin-based resin,
   wherein the missing part is located in an intermediate part of the body side foam member, and
   wherein the fitting member is mounted in the missing part.

2. The article according to claim 1, wherein the missing part alleviates stress applied to the insert by a volume change of the outer-shell-configuring part.

3. The article according to claim 1, wherein the insert comprises:
   two or more engagement parts that are engaged with the foam in the body side foam member; and
   a connecting part that connects the two or more engagement parts, and
   wherein the connecting part is partially located in the missing part.

4. The article according to claim 1, wherein the insert comprises:
   two or more engagement parts that are engaged with the foam in the body side foam member; and
   a connecting part that connects the two or more engagement parts, and
   wherein at least one of the engagement parts is partially located in the missing part.

5. The article according to claim 1, wherein the missing part is a portion where the insert is exposed.

6. The article according to claim 1,
   wherein the body side foam member is separated into a plurality of divided foam pieces, and
   wherein the divided foam pieces are separated by the missing part.

7. The article according to claim 1, wherein the fitting member is a foam comprising the same ingredient of the foam constituting the body side foam member.

8. The article according to claim 1, wherein a surface shape of the fitting member is smoothly connected with a surface shape of the foam constituting the body side foam member.

9. The article according to claim 1, wherein the fitting member is physically engaged with the foam constituting the body side foam member.

10. The article according to claim 1, wherein the fitting member is physically engaged with the insert.

11. A seat for an automobile comprising:
    the foam molding article according to claim 1;
    a cushion layer; and
    a skin layer.

* * * * *